United States Patent
Satoyama et al.

(10) Patent No.: US 9,354,819 B2
(45) Date of Patent: *May 31, 2016

(54) STORAGE SYSTEM INCLUDING MULTIPLE STORAGE APPARATUSES AND POOL VIRTUALIZATION METHOD

(71) Applicant: Hitachi, Ltd., Tokyo (JP)

(72) Inventors: Ai Satoyama, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,666

(22) Filed: Jul. 20, 2015

(65) Prior Publication Data

US 2015/0324143 A1 Nov. 12, 2015

Related U.S. Application Data

(63) Continuation of application No. 13/639,931, filed as application No. PCT/JP2012/004615 on Jul. 20, 2012, now Pat. No. 9,104,590.

(51) Int. Cl.
*G06F 3/06* (2006.01)
*G06F 12/10* (2016.01)

(52) U.S. Cl.
CPC ............ *G06F 3/0619* (2013.01); *G06F 3/0607* (2013.01); *G06F 3/0665* (2013.01); *G06F 3/0683* (2013.01); *G06F 3/0689* (2013.01); *G06F 12/1009* (2013.01)

(58) Field of Classification Search
CPC . G06F 12/1009; G06F 3/0607; G06F 3/0665; G06F 12/10; G06F 12/109; G06F 12/0292; G06F 2212/652; G06F 3/0631; G06F 3/0662–3/0655; G06F 3/067
See application file for complete search history.

(56) References Cited

U.S. PATENT DOCUMENTS

| 7,613,945 | B2 | 11/2009 | Soran et al. | |
|---|---|---|---|---|
| 7,937,553 | B2 | 5/2011 | Sakaguchi et al. | |
| 2006/0155950 | A1* | 7/2006 | Smith | G06F 3/0619 711/171 |
| 2008/0049276 | A1* | 2/2008 | Abe | G06F 3/0608 358/524 |
| 2008/0270733 | A1* | 10/2008 | Sakaguchi et al. | G06F 3/0608 711/173 |

(Continued)

OTHER PUBLICATIONS

International Search Report received in PCT/JP2012/004615 dated Mar. 14, 2013.

*Primary Examiner* — Jared Rutz
*Assistant Examiner* — Jean Edouard
(74) *Attorney, Agent, or Firm* — Foley & Lardner LLP

(57) ABSTRACT

A plurality of storage apparatuses including a first and second storage apparatus, wherein said first storage apparatus is configured to have a first virtual volume composed of a plurality of virtual segments, at least said second storage apparatus is configured to have a pool composed of a plurality of real pages, each storage apparatus is configured to manage a virtual pool comprising one or more pools including at least said pool, said virtual pool is composed of a plurality of virtual pages, each virtual page corresponding to any real page, and said first storage apparatus is configured to receive a write command that specifies an address belonging to an unallocated virtual segment, allocate a free virtual page to said unallocated virtual segment, and write data to the real page corresponding to the allocated virtual page, even when said first storage apparatus does not have a pool composed of real pages.

5 Claims, 38 Drawing Sheets

(56) References Cited

U.S. PATENT DOCUMENTS

| | | | |
|---|---|---|---|
| 2009/0043942 A1* | 2/2009 | Shiga | G06F 3/0605 711/4 |
| 2009/0070541 A1* | 3/2009 | Yochai | G06F 3/0605 711/165 |
| 2009/0100237 A1* | 4/2009 | Orikasa | G06F 3/0617 711/162 |
| 2009/0240880 A1* | 9/2009 | Kawaguchi | G06F 3/0617 711/114 |
| 2009/0254695 A1* | 10/2009 | Deguchi | G06F 3/061 711/100 |
| 2010/0235573 A1* | 9/2010 | Asano | G06F 3/0608 711/114 |
| 2010/0312976 A1* | 12/2010 | Kaneda | G06F 3/0605 711/162 |
| 2011/0264868 A1 | 10/2011 | Takata et al. | |
| 2012/0017042 A1 | 1/2012 | Matsui et al. | |
| 2012/0166748 A1 | 6/2012 | Satoyama et al. | |

* cited by examiner

Fig. 6

VOL table #0
3511

| TD# (601) | GLDEV# (602) | LLDEV# (603) | Type (604) | Capacity (605) |
|---|---|---|---|---|
| 0 | 0 | 1 | TP | 200GB |
| .... | .... | .... | .... | .... |

Fig. 7

LDEV table #0
3512

| LLDEV# (701) | VDEV# (702) | Address range | VEDV type |
|---|---|---|---|
| 0 | 0 | xxx - xxx | .... |
| .... | .... | .... | .... |

VS/VP mapping table #0
170

| VS# (801) | VP# (802) |
|---|---|
| 0 | - |
| 1 | 3 |
| .... | .... |

Fig. 9

Virtual pool table #0
3513

| VP# (901) | Status (902) | Access status (IOPS) (903) | VP type # (904) | RP# (905) |
|---|---|---|---|---|
| 0 | Available | 5000 | 1 | .... |
| .... | .... | .... | .... | .... |

Fig. 10

VP type table #0
3514

| Type # | Storage site | PDEV attribute |
|---|---|---|
| 1 | Storage apparatus #0 | SSD |
| 2 | Storage apparatus #1 | SSD |
| 3 | Storage apparatus #1 | SAS |
| 4 | Storage apparatus #0 | SATA |
| 5 | External storage apparatus | SATA |
| 6 | Storage apparatus #1 | SATA |

Pool table #0
3515

| Pool VOL # | Tier # |
|---|---|
| 0 | 0 |
| ..... | ..... |

Tier table #0
3516

| Tier # | Condition | VP type # |
|---|---|---|
| 1 | ..... | 1 |
| 2 | ..... | 2 |
| 3 | ..... | 4 |
| 4 | ..... | 5 |
| 5 | ..... | 3 |
| 6 | ..... | 6 |

Tier table #1
3516

| Tier # | Condition | VP type # |
|---|---|---|
| 1 | ..... | 2 |
| 2 | ..... | 1 |
| 3 | ..... | 3 |
| 4 | ..... | 6 |
| 5 | ..... | 4 |
| 6 | ..... | 5 |

Page table #0
3517

1301, 1302, 1303

| RP# | RP position information | VP# |
|---|---|---|
| 0 | .... | .... |
| .... | .... | .... |

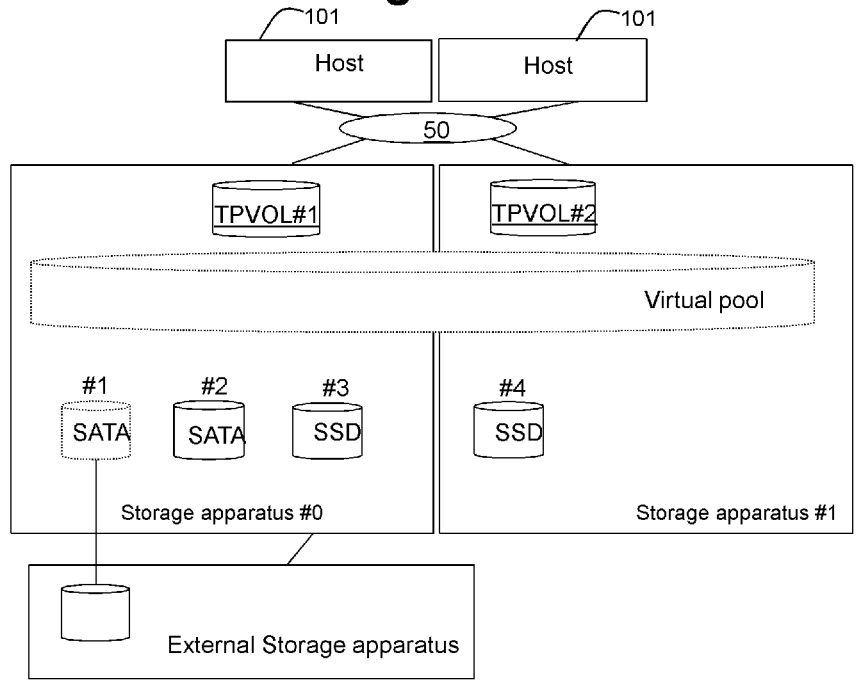

VP type table 3514

| Type # | Storage location | PDEV attribute |
|---|---|---|
| 1 | Storage apparatus #0 | SSD |
| 2 | Storage apparatus #1 | SSD |
| 3 | Storage apparatus #0 | SATA |
| 4 | External Storage apparatus of Storage apparatus #0 | SATA |

Tier table #0

| Tier # | Condition | Type # |
|---|---|---|
| 1 | Storage apparatus #0 | 1 |
| 2 | Storage apparatus #0 | 2 |
| 3 | Storage apparatus #1 | 3 |
| 4 | External Storage apparatus | 4 |

Tier table #1

| Tier # | Condition | Type # |
|---|---|---|
| 1 | Storage apparatus #1 | 2 |
| 2 | Storage apparatus #0 | 1,3,4 |

4301  GLDEV management table #0

| GLDEV# | LLDEV# |
|---|---|
| 0 | 0 |
| 1 | 1 |
| ... | ... |
| 64 | Storage apparatus #1 |
| ... | ... |

4301  GLDEV management table #1

| GLDEV# | LLDEV# |
|---|---|
| 0 | Storage apparatus #0 |
| ... | ... |
| 64 | 0 |
| 65 | 1 |
| ... | ... |

4302  Virtual storage configuration table

| Virtual storage apparatus number | #X1 |
|---|---|
| Storage apparatus number information | #0, #1 |

STORAGE SYSTEM INCLUDING MULTIPLE STORAGE APPARATUSES AND POOL VIRTUALIZATION METHOD

CROSS-REFERENCE TO RELATED PATENT APPLICATIONS

This application is a Continuation of U.S. application Ser. No. 13/639,931 (National Stage of PCT/JP2012/004615), filed Oct. 8, 2012, incorporated herein by reference in its entirety.

TECHNICAL FIELD

The present invention generally relates to a virtualization of a storage.

BACKGROUND ART

Patent Literatures 1 and 2 disclose known capacity virtualization techniques. According to these techniques, a storage apparatus manages a virtual volume composed of a plurality of virtual areas and a pool composed of a plurality of real areas. When the storage apparatus receives a write command that specifies an address belonging to the virtual area, the storage apparatus allocates an unallocated real area to a write-destination virtual area and writes data involved with the write command to the real area.

Patent Literature 3 discloses a technique that allows each of a plurality of storage apparatuses (modules) to use a pool in another storage apparatus.

CITATION LIST

Patent Literature

[PTL 1]
U.S. Patent Publication No. 2009/0070541
[PTL 2]
U.S. Pat. No. 7,613,945
[PTL 3]
U.S. Patent Publication No. 2009/0254695

SUMMARY OF INVENTION

Technical Problem

When a storage apparatus receives a write command that specifies an address belonging to a virtual area, the storage apparatus allocates a real area in a pool in the storage apparatus to the virtual area. When the storage apparatus receives a read command that specifies an address belonging to a virtual area, if another storage apparatus has the real area allocated to the virtual area, the storage apparatus makes a request for read-target data specified by the read command from the other storage apparatus.

As described above, a pool is defined in each storage apparatus, and each storage apparatus has to recognize which storage apparatus has the pool having the real area allocated to the relevant virtual area.

Solution to Problem

There are a plurality of storage apparatuses including a first storage apparatus and a second storage apparatus. The first storage apparatus has a virtual volume composed of a plurality of virtual segments (virtual storage areas). At least the second storage apparatus has a pool composed of a plurality of real pages (real storage areas). The plurality of storage apparatuses each manage one or more pools including at least the pool in the second storage apparatus as a virtual pool. The virtual pool is composed of a plurality of virtual pages (virtual storage areas), and each virtual page corresponds to any of the real pages. The first storage apparatus receives a write command that specifies an address belonging to an unallocated virtual segment to which no virtual page is allocated, allocates a free virtual page from the virtual pool to the unallocated virtual segment, and writes data accompanying the write command to the real page corresponding to the allocated virtual page.

Advantageous Effects of Invention

Even if a plurality of storage apparatuses have a plurality of pools, each storage apparatus can manage the plurality of pools as one virtual pool. The first storage apparatus can allocate a virtual page from the virtual pool to a virtual segment in a virtual volume. Even a storage apparatus having no pool can manage the virtual pool as a pool and allocate a virtual page from the virtual pool to a virtual segment.

BRIEF DESCRIPTION OF DRAWINGS

FIG. 6 is a diagram showing a configuration of a VOL table #0.
FIG. 7 is a diagram showing a configuration of an LDEV table #0.
FIG. 8 is a diagram showing a configuration of a VS/VP mapping table #0.
FIG. 9 is a diagram showing a configuration of a virtual pool table #0.
FIG. 10 is a diagram showing a configuration of a VP type table #0.
FIG. 11 is a diagram showing a configuration of a pool table #0.
FIG. 12A is a diagram showing a configuration of a tier table #0.
FIG. 12B is a diagram showing a configuration of a tier table #1.
FIG. 13 is a diagram showing a configuration of a page table #0.

FIG. 24 is a diagram for illustrating an example of changing of lanes associated with a TPVOL.

FIG. 39 illustrates an example of information management according to the embodiment.

DESCRIPTION OF EMBODIMENTS

Figure 1:
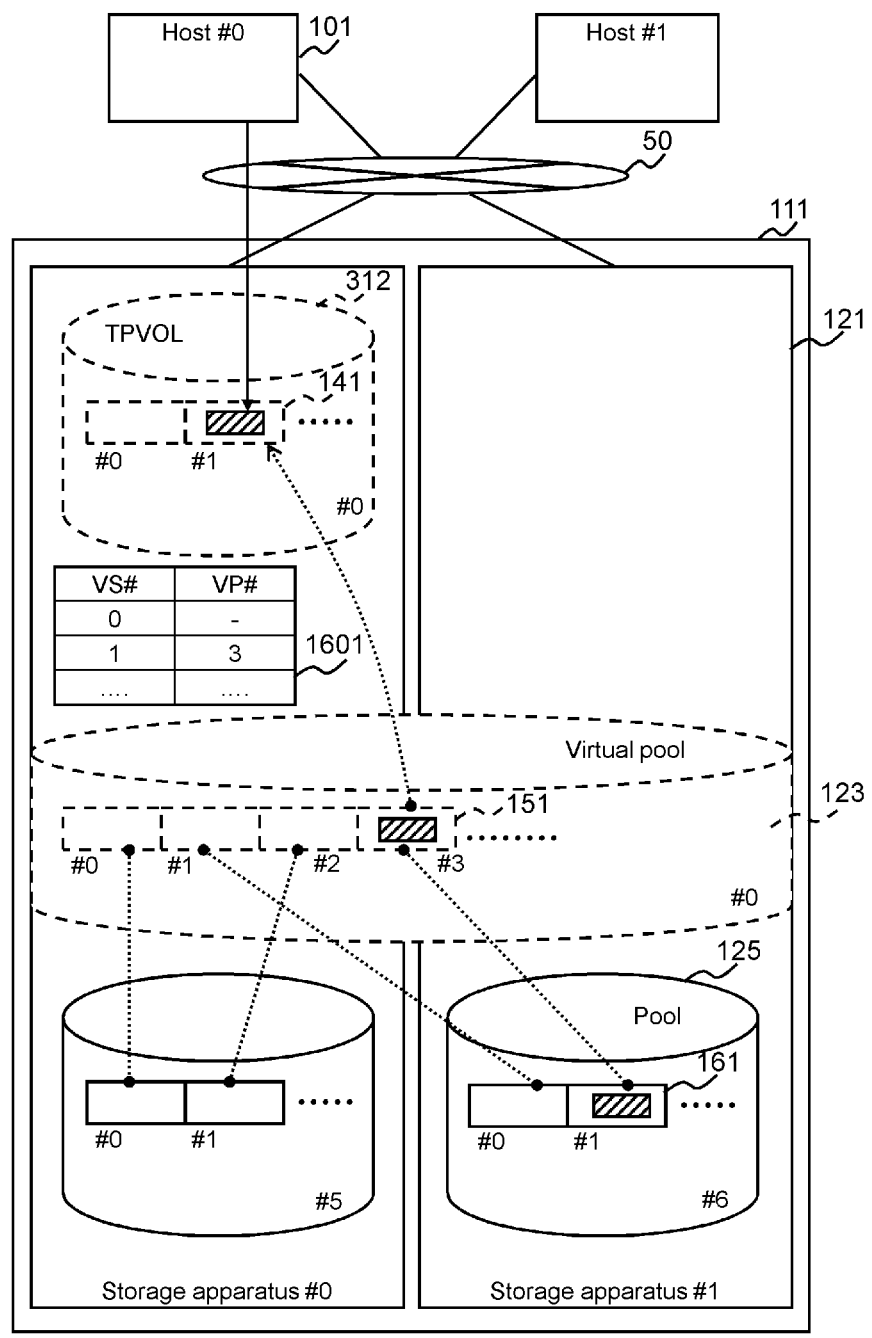
FIG. 1 is a diagram schematically showing an embodiment.

In the following, an embodiment will be described.

In the following description, some information may be referred to as "xxx table." However, information can have any data structure. To show that the information does not depend on the data structure, "xxx table" can be referred to also as "xxx information."

In the following, some processing may be described with a "program" as the subject. However, the program is executed by a processor (a CPU (Central Processing Unit, for example) in a control device to perform a predetermined processing by appropriately using a storage resource (a memory, for example) and/or a communication interface device (a communication port, for example), so that the subject of the processing may be the processor, the control device including the processor or another apparatus (a storage apparatus, for example). A part or the whole of the processing performed by the processor may be performed by a hardware circuit in the control device. The computer program may be installed from a program source into the control device. The program source may be a program distribution server or a storage medium, for example.

In the following, a group of one or more computers that manage storage apparatuses in a computer system and display information may sometimes be referred to as a management system. In a context where a management computer displays information, the management computer is the management system. Alternatively, a combination of the management computer and a display computer may be the management system. Alternatively, to improve the speed or reliability of the management processing, a plurality of computers may be used to achieve a processing equivalent to that of the management computer. In this case, the plurality of computers (including the display computer if the display computer is additionally used for display) form the management system. In this embodiment, the management computer is the management system.

In the following description, to discriminate among elements of the same type, identifiers (identification numbers, for example) assigned to the elements may be used instead of the reference numeral assigned to the elements. For example, in a context where storage apparatuses do not have to be discriminated from each other, the storage apparatuses are expressed as "storage apparatuses 121," whereas in a context where storage apparatuses 121 have to be discriminated from each other, the storage apparatuses are expressed as a "storage apparatus #0" and a "storage apparatus #1," for example.

Terms used in the following description have the meanings described below.

"VOL" is an abbreviation of a logical volume and means a logical storage device. The VOL may be a real VOL (RVOL) or a virtual VOL (VVOL). Furthermore, the VOL may be an online VOL that is provided to an external unit (a host computer, for example) coupled to the storage apparatus that has the VOL, or an offline VOL that is not provided to the external unit (that is, not recognized by the external unit).

"RVOL" is a VOL that relies on a physical storage resource (a RAID group composed of a plurality of PDEVs, for example) of the storage apparatus that has the RVOL.

"VVOL" may be an externally-coupled VOL (EVOL) based on a storage virtualization technique that relies on a storage resource (a logical volume, for example) of an external storage apparatus coupled to the storage apparatus that has the VVOL, or a VOL (a TPVOL) composed of a plurality of virtual segments (virtual storage areas) based on a capacity virtualization technique (typically, thin provisioning). The TPVOL is typically an online VOL.

"PDEV" is an abbreviation of a nonvolatile physical storage device.

"Pool" is a storage resource composed of a plurality of real pages (real storage areas). The pool is composed of a plurality of pool VOLs, for example, and each pool VOL is divided into two or more real pages.

"Pool VOL" is a VOL that is a constituent of a pool. The pool VOL may be an RVOL or an EVOL. The pool VOL is typically an offline VOL.

SUMMARY OF EMBODIMENT

FIG. 1 schematically shows an embodiment.

A storage system 111 is composed of a plurality of storage apparatuses 121. Although the storage system 111 is composed of two storage apparatuses #0 and #1 in this embodiment, the storage system 111 can be composed of three or more storage apparatuses 121. One or more host computers (referred to as a host, hereinafter) 101 are coupled to at least one storage apparatus 121 over a communication network 50.

The storage apparatus #0 has a TPVOL (#0) 312 composed of a plurality of virtual segments 141.

Each of the storage apparatuses #0 and #1 has a pool 125. The pool 125 is composed of a plurality of real pages 161. The pool 125 is specifically defined in the storage apparatus 121 that has the pool 125. That is, a pool #5 is defined in the storage apparatus #0, and a pool #6 is defined in the storage apparatus #1.

According to this embodiment, a virtual pool (#0) 123 that comprises the plurality of pools #5 and #6 virtualized is prepared. The storage apparatuses #0 and #1 each manages the virtual pool #0. That is, each of the storage apparatuses #0 and #1 manages the plurality of pools #5 and #6 as one virtual pool #0.

The virtual pool #0 is composed of a plurality of virtual pages 151. One real page 161 is allocated to one virtual page 151. For example, a virtual page #0 is allocated to a real page #0 in the pool #5, and a virtual page #1 is allocated to a real page #0 in the pool #6.

When the storage apparatus #0 receives a write command that specifies an address belonging to a virtual segment #1 of the TPVOL #0, the storage apparatus #0 allocates a virtual page #3 in the virtual pool #0 to a write-destination virtual segment (a virtual segment to which the address specified by the write command belongs) #1. The real page #1 in the pool #6 is allocated to the virtual page #3, and the pool #6 exists in the storage apparatus #1. The storage apparatus #0 determines that the entity of the virtual page #3 exists in the storage apparatus #1, designates write-target data accompanying the received write command as a write target, and transmits the write command that specifies the write-destination address belonging to the virtual page #3 to the storage apparatus #1. The storage apparatus #1 receives the write command, and writes the write-target data to the real page #1 in the pool #6 allocated to the virtual page #3 according to the write command.

The storage apparatus #0 stores a table (referred to as a VS/VP mapping table, hereinafter) 1601 that indicates which virtual page is allocated to which virtual segment. The table 1601 shown in FIG. 1 shows that the virtual segment (VS) #0 is an unallocated virtual segment to which no virtual page 151 is allocated, and the virtual page #3 is allocated to the virtual segment #1.

As described above, according to this embodiment, the virtual pool 123, which is a space comprising one or more pools 125 virtualized, is provided between a layer of the TPVOL 312 and a layer of the pool 125. This enables the storage apparatus 121 to manage one or more pools 125 in one or more other storage apparatuses 121 as if the pools are one pool in the storage apparatus 121 itself.

For example, this embodiment has this advantage: the capacity of the virtual pool 123 is larger than the total capacity of the one or more pools 125, so that even if the capacity of a pool 125 in a storage apparatus 121 increases, the current task can be continued without increasing the capacity of the virtual pool 123. In this case, available virtual pages (virtual pages that can be allocated) in the virtual pool 123 can increase (When an available virtual page has been allocated to a virtual segment, the status of the virtual page changes from free to allocated). That is, of the plurality of virtual pages 151 in the virtual pool 123, each storage apparatus 121 can manage virtual pages 151 equivalent to the total capacity of the one or more pools 125 as available virtual pages, and manage the remaining virtual pages 151 as unavailable virtual pages. When the capacity of a pool 125 in a storage apparatus 121 increases, each storage apparatus 121 can turn one or more of the unavailable virtual pages equivalent to the increase of the capacity into free virtual pages. When the capacity of a pool 125 in a storage apparatus 121 decreases, each storage apparatus 121 can turn one or more of the free virtual pages equivalent to the decrease of the capacity into unavailable virtual pages. Note that the total capacity of the pool 125 can increase or decrease in accordance with an increase or decrease in the number of storage apparatuses 121.

Figure 2:
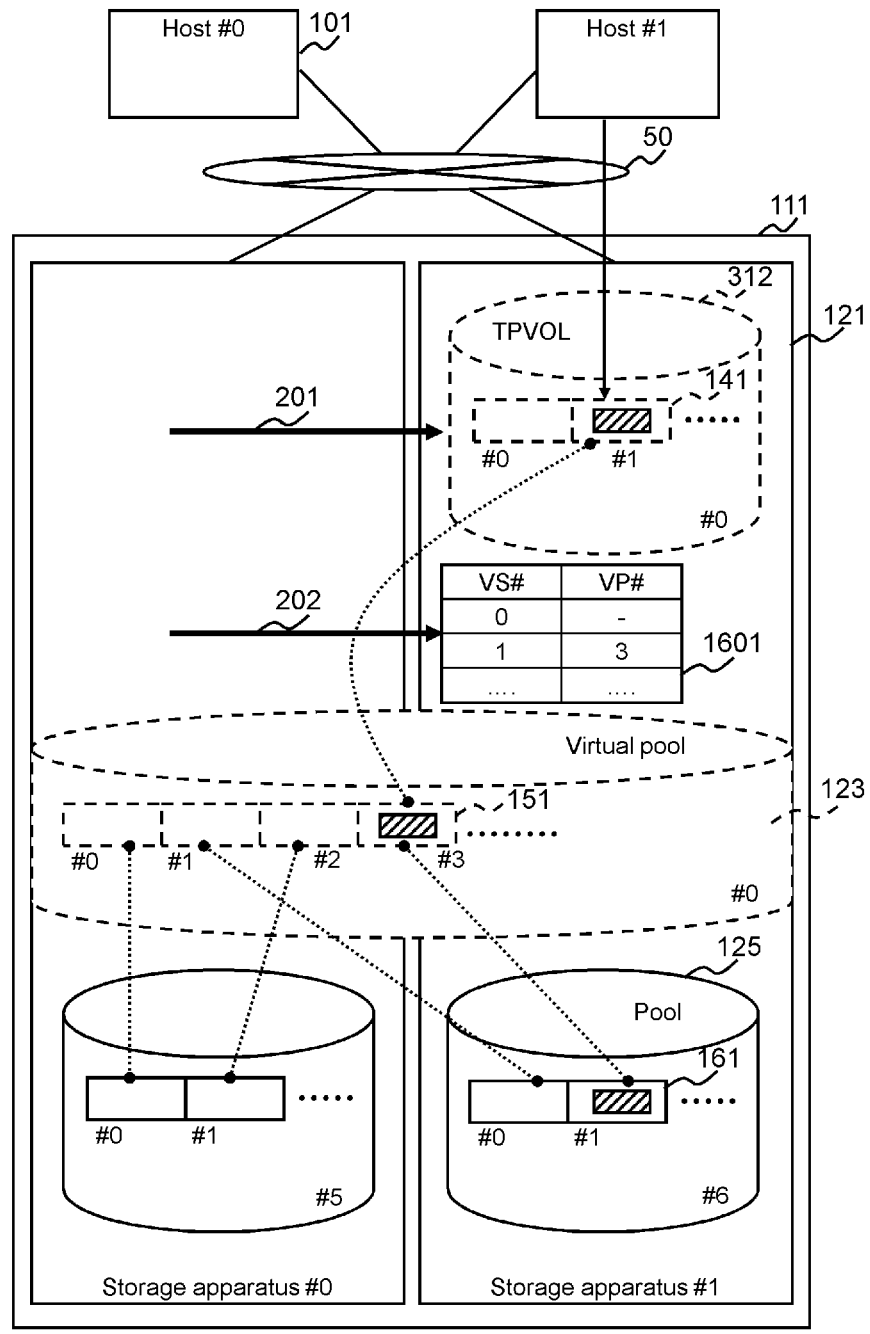
FIG. 2 is a diagram for illustrating migration of a TPVOL #0.

According to this embodiment, for example, as shown in FIG. 2, the TPVOL 125 can be migrated between the storage apparatuses without changing the correlation between the virtual segments and the virtual pages. For example, the storage apparatus #0 migrates the TPVOL #0 into the storage apparatus #1 as shown by the arrow 201 and transmits the VS/VP mapping table 1601 for the TPVOL #0 to the storage apparatus #1, which is the destination of the TPVOL #0, as shown by the arrow 202. The storage apparatus #1 can grasp which virtual page is allocated to which virtual segment in the TPVOL #0 by referring to the VS/VP mapping table 1601. Therefore, for example, after the migration of the TPVOL #0, if the storage apparatus #1 receives a read command that specifies the TPVOL #0 from the host 101, the storage apparatus #1 can determine, in the VS/VP mapping table 1601, the virtual page allocated to the virtual segment belonging to the address specified by the read command (a read-target virtual segment). The storage apparatus #1 can read the read-target data from the real page corresponding to the determined virtual page and transmit the data to the host 101.

If the virtual computer (not shown) that uses the TPVOL #0 migrates from a host #0 that accesses the storage apparatus #0 to a host #1 that accesses the storage apparatus #1, for example, the TPVOL #0 can be migrated from the storage apparatus #0 to the storage apparatus #1. These migrations can occur according to an instruction from a management computer described later.

In the following, this embodiment will be described in detail.

<Hardware Configuration of Computer System>

Figure 3:
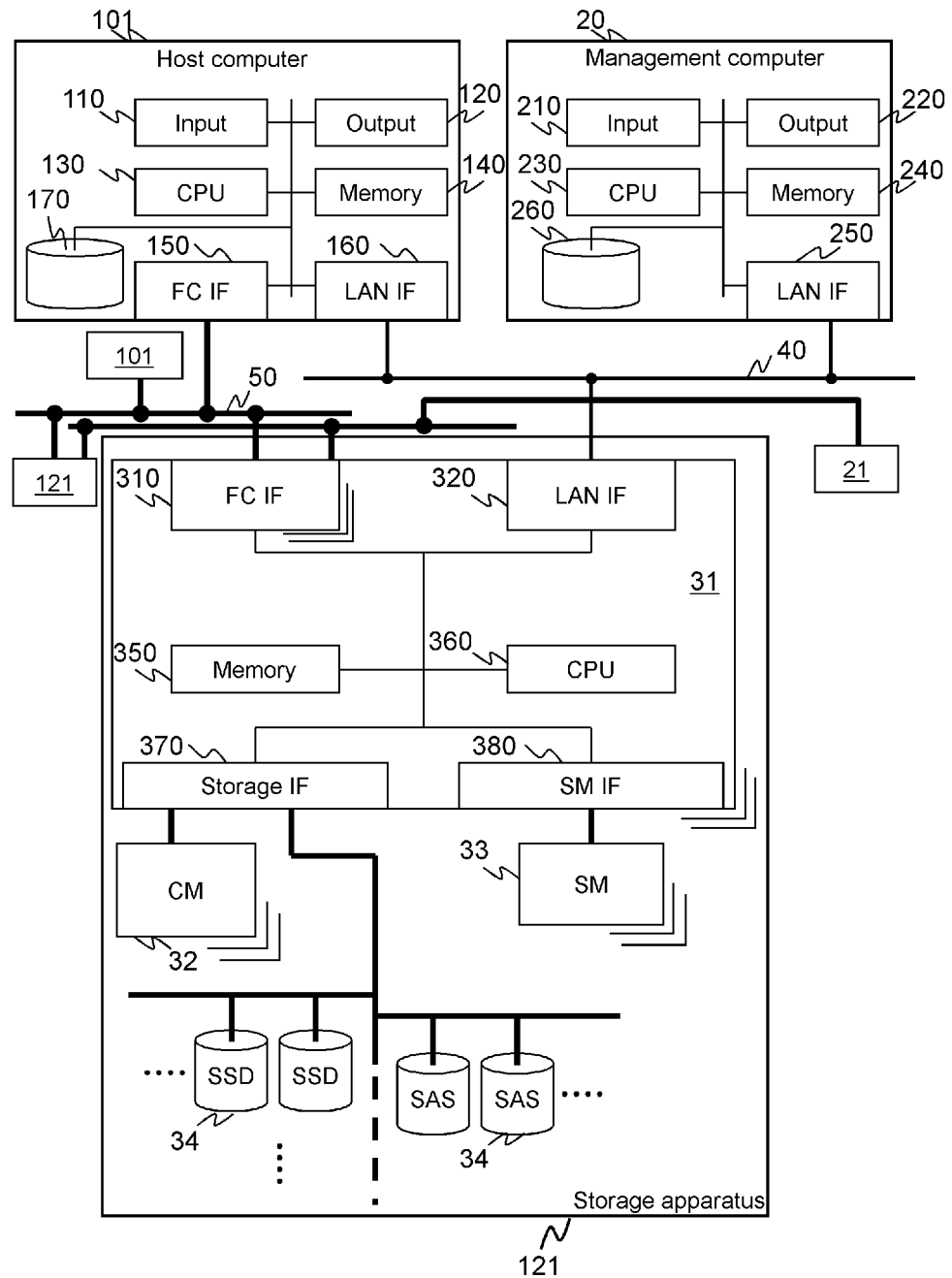
FIG. 3 is a diagram showing an example of a hardware configuration of a computer system according to the embodiment.

FIG. 3 shows an example of a hardware configuration of a computer system according to this embodiment.

The host 101 is coupled to at least one storage apparatus 121 of the plurality of storage apparatuses 121 forming the storage system 111 over a first communication network 50 and a second communication network 40, for example. At least one storage apparatus 121 of the plurality of storage apparatuses 121 forming the storage system 111 is coupled to one or more external storage apparatuses 21 over a third communication network 45 (or a dedicated line), for example. In the following, a storage apparatus forming the storage system 111 that is close to the host 101 may sometimes be referred to as an "edge storage," and an external storage apparatus 21 that is located farther from the host 101 than the edge storage and coupled to the edge storage may sometimes be referred to as a "core storage." The first and third communication networks are, for example, FC (Fibre Channel) networks, and the second communication network is, for example, a LAN (Local Area Network) 40. The first to third communication networks may be an integrated network. In this embodiment, the plurality of storage apparatuses (edge storages) 121 form the storage system 111, and the external storage apparatuses (core storages) 21 are not included in the storage system 111. An external storage apparatus is not essential to a configuration prerequisite for the present invention. A coupling method for the external storage apparatus is disclosed in, for example, U.S. Pat. No. 7,051,121.

A management computer 20 is coupled to at least the storage apparatus 121 of the storage apparatus 121 and the host 101 over the second communication network 40, for example.

The host 101 is a computer that accesses a VOL (a target device) provided by the storage apparatus 121. The host 101 has an input device (a keyboard or a pointing device, for example) 110, an output device (a display device, for example) 120, a communication interface device (an FC IF 150 or a LAN IF 160, for example), a storage resource (a nonvolatile storage device such as a memory 140 and a HDD (Hard Disk Drive) 170, for example), and a control device including a CPU 130 coupled to these components. The FC IF 150 is an interface device for communication over the FC network 50 or 45. The LAN IF 160 is an interface device for communication over the LAN 40.

The management computer 20 is a computer that conducts a management of the storage apparatus 121 (setting of a pool, a VOL or the like, for example). The management computer 20 has an input device (a keyboard or a pointing device, for example) 210, an output device (a display device, for example) 220, a storage resource (a nonvolatile storage device such as a memory 240 and an HDD 260, for example), and a control device including a CPU 230 coupled to these components.

The storage apparatus 121 has a plurality of PDEVs 34 and a controller 31 coupled to the PDEVs 34. The controller 31 has a memory including a cache memory (CM) 32 and a shared memory (SM) 33.

The plurality of PDEVs 34 may be of the same medium type and of the same communication interface type or may be of the same medium type but differ in communication interface type. The medium type is hard disk or flash memory, for example. The communication interface type is FC, SAS (Serial Attached SCSI) or SATA (Serial ATA), for example. In this embodiment, the PDEV may be a SSD (Solid State Device), an SAS HDD or an SATA HDD, for example. Two or more PDEVs of the same medium type and of the same communication interface type form an RAID group.

The cache memory 32 temporarily stores data read from or written to the PDEV 34. The shared memory 33 stores information concerning the controller 31 or the PDEV 34.

The controller 31 controls storage of data into the PDEV 34. The controller 31 has a communication interface device (an FC IF 310, a LAN IF 320, a storage IF 370 and an SM IF 380, for example), a storage resource (a nonvolatile memory (NV memory) 330 and a memory 350), for example, and a control device including a CPU 360 coupled to these components.

The FC IF 310 is an interface device for data transmission/data reception to/from the host 101 over the FC network 50. The LAN IF 320 is an interface device for data transmission/reception to/from the host 101 or the management computer 20 over the LAN 40. The FC IF 310 has one or more communication ports.

The memory 350 includes at least one of a volatile memory and a nonvolatile memory. The memory 350 stores a computer program executed by the CPU 360 or configuration information concerning the storage apparatus 121. The memory 350 stores data read from at least one of the shared memory 33 and the cache memory 32 and/or a computer program.

The CPU 360 reads a computer program from the memory 350 and executes a processing described in the program.

The storage IF 370 is an interface device for data transmission/reception to/from the PDEV 34 and the cache memory 32.

The SM IF 380 is an interface device for data transmission/reception to/from the shared memory 33.

The external storage apparatus may be coupled to one storage apparatus of the plurality of storage apparatuses 121 forming the storage system 111 or coupled to two or more of the storage apparatuses. Note that the external storage apparatus may be an optical disc library. In that case, the performance of access to the optical disk library is low but the bit costs of storage areas can advantageously be reduced. The host 101 may be coupled to one storage apparatus of the plurality of storage apparatuses 121 or coupled to two or more of the storage apparatuses 121.

<Layer Configuration of Storage Area>

Figure 4:
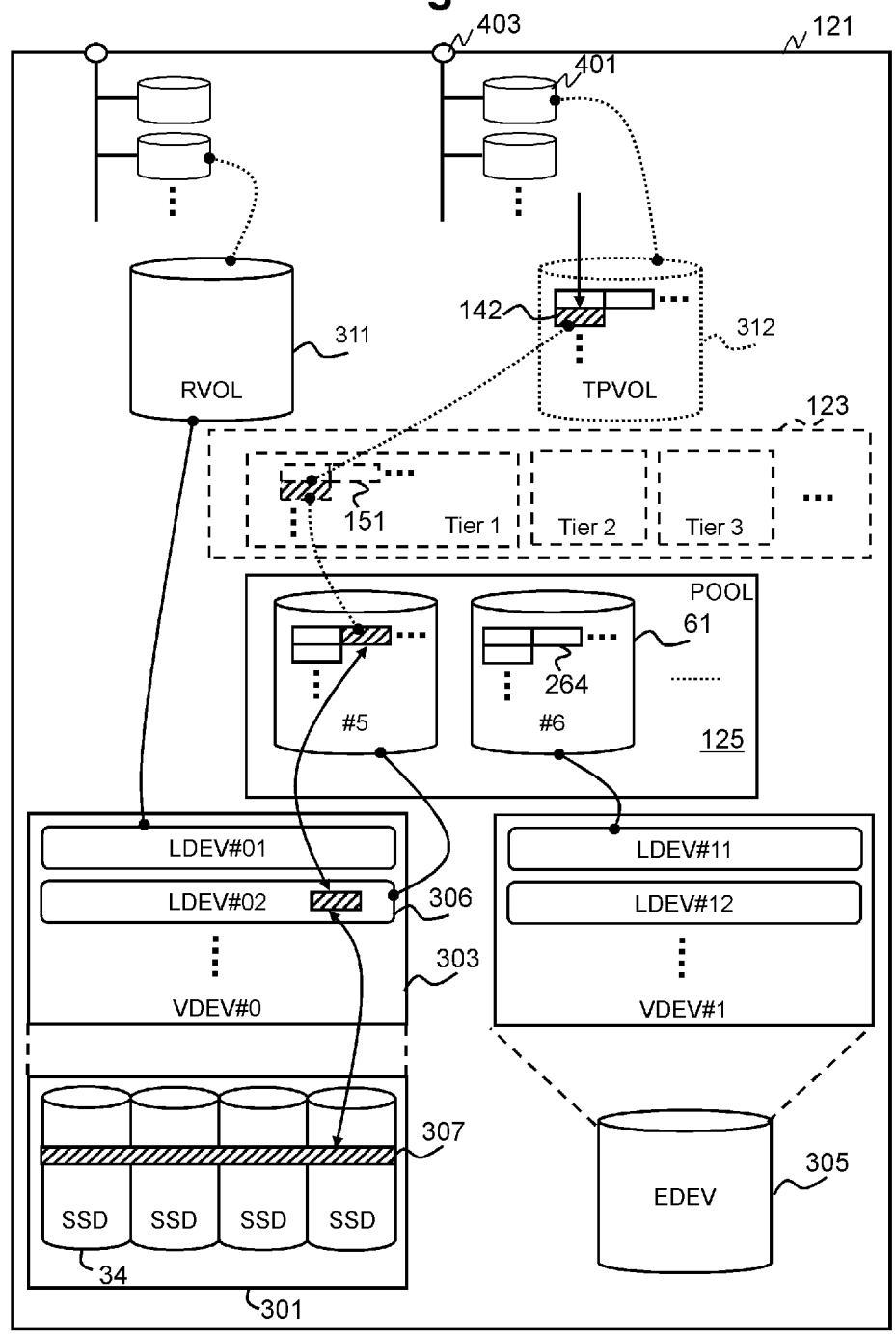
FIG. 4 is a diagram showing a layer configuration of a storage area according to the embodiment.

FIG. 4 shows a layer configuration of a storage area according to this embodiment. In the following, the storage area will be described in order from the lowest layer.

There is a RAID group 301. As described above, the RAID group 301 is composed of a plurality of PDEVs 34 of the same type with the same communication interface and has a stripe column over the plurality of PDEVs 34.

There is an EDEV 305. EDEV is an abbreviation of "external device," and the EDEV 305 is a logical storage device relying on a storage resource in an external storage apparatus (not shown). The storage resource in the external storage apparatus is a RAID group or a VOL, for example. When data is input to or output from the EDEV 305, the data is input to or output from the storage resource in the external storage apparatus on which the EDEV 305 relies.

A VDEV 303 exists at a higher level than the RAID group 301 and the EDEV 305. The VDEV 303 is a virtual storage resource relying on the RAID group 301 or the EDEV 305. The storage area of the VDEV 303 is partitioned into a plurality of LDEVs 306. The VDEV 303 may be one LDEV 306. In the following, the VDEV relying on the RAID group 301 may sometimes be referred to as a "VDEV of a first type," and the VDEV relying on the EDEV 305 may sometimes be referred to as a "VDEV of a second type." Note that, as illustrated in FIG. 33, there may be a VDEV (#8) of a third type as a virtual storage resource that is based on neither of the RAID group 301 and EDEV 305.

A pool 125 exists at a higher level than the VDEV 303. The pool 125 is composed of a plurality of pool VOLs 61. Each pool VOL 61 is associated with an LDEV. The pool VOL 61 is an offline VOL and therefore is not associated with a target device specified by the host 101. Each pool VOL 61 is associated with an LDEV in a VDEV of the first type or with an LDEV in a VDEV of the second type. The pool VOL 61 is composed of a plurality of real pages 161. In this embodiment, the real page 161 and the stripe column 307 are associated with each other in a one-to-one relationship. Data stored in the real page 161 is also stored in the stripe column 307 associated with the real page 161. A plurality of stripe columns 307 may be associated with one real page 161.

Figure 33:
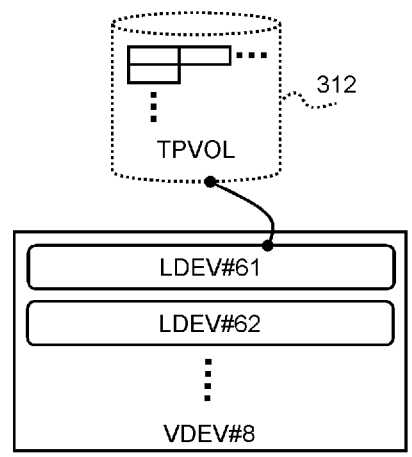
FIG. 33 illustrates the relationship between three types of VDEVs and the TPVOL according to the embodiment.

Furthermore, an LDEV (#61) in the VDEV of the third type may be associated with the TPVOL 312 as illustrated in FIG. 33. An LDEV may not be assigned to the TPVOL 312.

A virtual pool 123 comprising one or more pools 125 virtualized including the pools 125 shown (and pools in another storage apparatus not shown) exists at a higher level than the pool 125. The virtual pool 123 is composed of a plurality of virtual pages 151. The plurality of virtual pages 151 are sorted into a plurality of virtual page types (VP types). The VP type can vary depending on which real page 161 in which storage apparatus the virtual page 151 is associated with.

The virtual pool 123 is composed of a plurality of tiers. A tier is preferably composed of virtual pages having the same I/O capability (or I/O capabilities within a predetermined allowable range). The I/O capability is an I/O frequency (the number of I/O commands that can be dealt with in a unit time (in units of I/O per second (IOPS), for example)) or a response time, for example. The level of the tier can depend on the level of the I/O capability. For example, the higher the I/O capability of the pool VOL forming the tier, the higher the level of the tier can be. In each storage apparatus 121, each tier is associated with one VP type. The correlation between the tiers and the VP types can differ among the storage apparatuses. While the virtual pool 123 is composed of a plurality of tiers in this embodiment, the configuration in which the virtual pool 123 is composed of a plurality of tiers is not essential to the present invention. That is, the virtual pool 123 does not necessarily need to be a so-called hierarchical pool which includes a plurality of tiers.

An online VOL exists at a higher level than the VDEV 303 and the virtual pool 123. The online VOL is an RVOL 311 or a TPVOL 312, for example. The RVOL 311 is a VOL that relies on the LDEV (#01) in the VDEV of the first type (#0). On the other hand, the TPVOL 312 is a VOL that does not rely on the VDEV 303.

A target device 401 exists at a higher level than the online VOL. One or more target devices 401 are associated with a communication port 403 of the FC IF 310, and each target device 401 is associated with a VOL.

Each TPVOL 312 is associated with one virtual pool 123, and a free virtual page in the virtual pool 123 associated with the TPVOL 312 is allocated to a virtual segment 142 of the TPVOL 312.

The host 101 transmits an I/O command (write command or read command) that specifies the target device to the storage apparatus 121. The target device is associated with the RVOL 311 or the TPVOL 312 as described above. When the storage apparatus 121 receives a write command that specifies the target device associated with the TPVOL 312, the following process occurs in the example of the layer configuration of the storage area shown in FIG. 4. That is, the storage apparatus 121 selects a free virtual page 151 from the virtual pool 123 and allocates the selected virtual page 151 to the write-destination virtual segment (the virtual segment to which the address specified by the write command belongs) 142. The storage apparatus 121 writes the write-target data to the allocated virtual page 151. Writing data to the virtual page 151 means writing data to the LLDEV #02 associated with the pool VOL #5 that has the real page 161 allocated to the virtual page 151. The LLDEV #02 is a LDEV in the VDEV of the first type, so that the data written to the LLDEV #02 is in actuality written to the stripe column 307 associated with the real page 161 allocated to the allocated virtual page 151 in the RAID group 301.

<Program and Information Stored in Memory 350 in Storage Apparatus 121>

Figure 5:
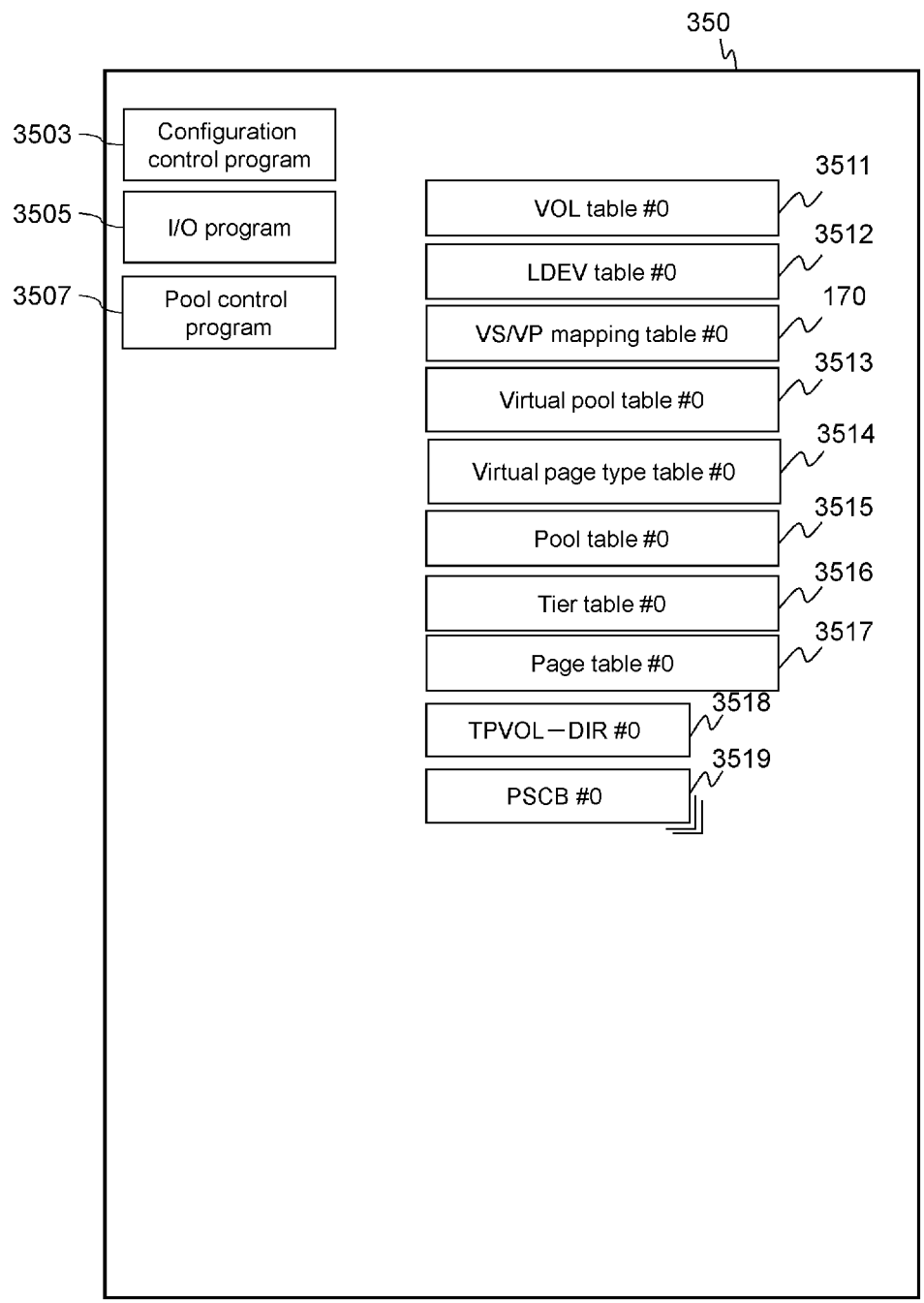
FIG. 5 is a diagram showing programs and information stored in a memory 350.

FIG. 5 shows programs and information stored in the memory 350.

The memory 350 stores a configuration control program 3503, an I/O program 3505, and a pool control program 3507, for example. The memory 350 further stores a VOL table 3511, a LDEV table 3512, a VS/VP mapping table 1601, a virtual pool table 3513, a VP type table 3514, a pool table 3515, a tier table 3516, a page table 3517, a TPVOL-DIR 3518 and a pool slot control block (PSCB) 3519. The memory 350 shown in FIG. 5 is the memory 350 in the storage apparatus #0, and therefore, identification information (#0) is attached to the information 3511 to 3519 and 170 stored in the memory 350. In the following, the information 3511 to 3519 and 170 stored in the memory 350 in the storage apparatus #0 may sometimes be described with the identification information (#0), and the information 3511 to 3519 and 170 stored in the memory 350 in the storage apparatus #1 may sometimes be described with the identification information (#1).

The configuration control program 3503 is to create or update at least one of the tables 3511 to 3517 and 170 according to a command from the management computer 20.

The I/O program 3503 is to perform a write processing or a read processing according to an I/O command from the host 101.

The pool control program 3507 is to perform a processing concerning the virtual pool 123 or the pool 125, such as a processing for migrating the TPVOL 312, a rebalance processing for relocating data in the virtual pool 123, and a processing for releasing the virtual page 151.

A VOL table #0 contains information concerning each VOL in the storage apparatus #0.

An LDEV table #0 contains information concerning each LDEV in the storage apparatus #0.

A VS/VP mapping table #0 represents a correlation between the virtual segments and the virtual pages of the TPVOL 312 in the storage apparatus #0.

A virtual pool table #0 contains information concerning the virtual pool 123.

A VP type table #0 contains information concerning each VP type in the virtual pool 123.

A pool table #0 contains information concerning the pool 125 in the storage apparatus #0.

A tier table #0 contains information concerning each tier in the pool 125 in the storage apparatus #0.

A page table #0 contains information concerning the real page 161 in the pool 125 in the storage apparatus #0.

A PSCB #0 is information concerning the real page 161 in the storage apparatus #0 and exists for each real page 161.

FIG. 6 shows a configuration of the VOL table #0.

The VOL table #0 contains the following information for each VOL:

(*) TD #601, which is the identification number of the target device to which the VOL is allocated;

(*) GLDEV #602, which is a global LUN (LDEV number) that is allocated to the VOL and specified by the host 101;

(*) LLDEV #603, which is a local LUN (LDEV # corresponding to the VOL) that is allocated to the VOL and used in the storage device #0 but not used in the host 101;

(*) type 604, which represents the type of the VOL; and (*) capacity 605, which represents the capacity of the VOL.

If the VOL exists in another storage apparatus (#1, for example), the identification information concerning the other storage apparatus (#1, for example) can be set as the LLDEV #603. This allows the storage apparatus #0 to know that the VOL determined from the GLDEV # exists in the other storage apparatus. The type 604 can be "TP" that represents the TPVOL or "Real" that represents the RVOL, for example. Although not shown, each storage apparatus 121 further stores a table that represents which target device is associated with which port of the storage apparatus 121. In this embodiment, it seems to the host 101 that any online VOL existing in any storage system exists in one storage system, because of the presence of the GLDEV #. However, to use the GLDEV # is not essential for storage virtualization.

FIG. 7 shows a configuration of the LDEV table #0.

The LDEV table #0 contains the following information for each LDEV:

(*) LLDEV #701, which is the identification number of the LDEV;

(*) VDEV #702, which is the identification number of the VDEV that has the LDEV;

(*) address range 703, which represents the part of the VDEV occupied by the LDEV; and (*) VDEV type 704, which represents the type of the VDEV that has the LDEV (whether the VDEV of the first type or the VDEV of the second type, for example).

FIG. 8 shows a configuration of the VS/VP mapping table #0.

The VS/VP mapping table #0 exists for each TPVOL. The VS/VP mapping table #0 contains the following information for each virtual segment:

(*) VS #801, which is the identification number of the virtual segment; and (*) VP #802, which is the identification number of the virtual page allocated to the virtual segment.

FIG. 9 shows a configuration of the virtual pool table #0.

The virtual pool table #0 contains the following information for each virtual page:

(*) VP #901, which is the identification number of the virtual page;

(*) status 902, which represents the status of the virtual page (allocated, available or unavailable, for example);

(*) access status 903, which represents the access status of the virtual page (I/O frequency or last I/O time, for example);

(*) VP type #904, which represents the identification number of the VP type to which the virtual page belongs; and (*) RP #905, which is the identification number of the real page (RP) allocated to the virtual page.

Although the access status 903 is provided for each virtual page in this embodiment, the access status 903 can also be provided for each virtual segment. The access status of the virtual segment is substantially the same as the access status of the virtual page allocated to the virtual segment. If the real page allocated to the virtual page exists in another storage apparatus such as the storage apparatus #1, the identification information for the other storage apparatus can be set as the RP #905. In this way, it is possible to show which storage apparatus has the real page allocated to the virtual page. The RP #905 can include the identification number of the pool VOL and/or pool having the real page in addition to the identification number of the real page.

FIG. 10 shows a configuration of the VP type table #0.

The VP type table #0 contains the following information for each VP type:

(*) VP type #1001, which represents the identification number of the VP type;

(*) storage site 1002, which is information representing the storage apparatus that actually stores the data written to the virtual page belonging to the VP type; and (*) PDEV attribute 1003, which represents the medium type and the communication interface type of the PDEV that actually stores the data written to the virtual page belonging to the VP type.

The storage apparatuses 121 in the storage system 111 have the same VP type table. For example, the VP type tables #0 and #1 have the same contents. This is because the virtual pool 123 is managed by each of the storage apparatuses 121.

FIG. 11 shows a configuration of the pool table #0.

The pool table #0 exists for each pool in the storage apparatus #0. The pool table #0 contains the following information for each pool VOL:

(*) pool VOL #1101, which is the identification number of the pool VOL; and (*) tier #1102, which is the identification number of the tier to which the pool VOL belongs.

The higher the tier, the smaller the identification number of the tier is, for example.

FIG. 12A shows a configuration of the tier table #0.

The tier table #0 contains the following information for each tier:

(*) tier #1201, which is the identification number of the tier;

(*) tier condition 1202, which represents the condition of the access status of the virtual page belonging to the tier (the range of the I/O frequency, for example); and (*) VP type #1203, which is the identification number of the VP type with which the tier is associated.

FIG. 12B shows a configuration of the tier table #1.

As can be seen from comparison with FIG. 12A, the correlation between the tier identification numbers and the VP type identification numbers in the storage apparatus #1 can be different from the correlation between the tier identification numbers and the VP type identification numbers in the storage apparatus #0. This is because even the virtual page belonging to the same VP type can have different I/O capabilities (I/O rate, for example) between the storage apparatus #0 and the storage apparatus #1.

FIG. 13 shows a configuration of the page table #0.

The page table #0 exists for each pool in the storage apparatus #0. The page table #0 contains the following information for each real page:

(\*) RP #1301, which is the identification number of the real page;

(\*) RP position information 1302, which is information concerning the position of the real page; and (\*) VP #1303, which is the identification number of the virtual page to which the real page is allocated.

The RP position information 1302 represents which pool VOL has the real page corresponding to the information 1302 and where in the pool VOL the real page exists, for example.

Figure 14A:
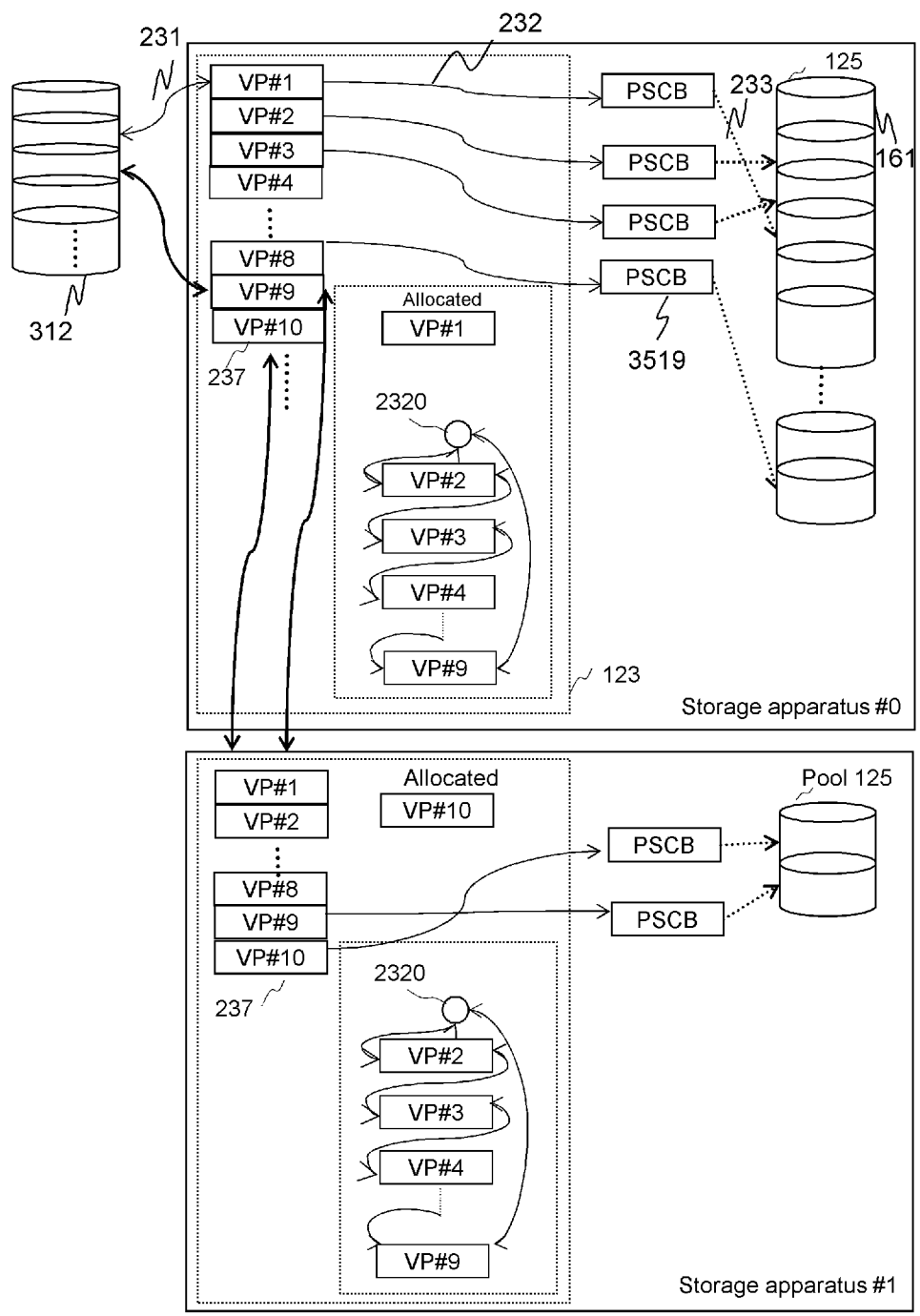
FIG. 14A illustrates an example of the relationship between TPVOLs and virtual pages.
Figure 14B:
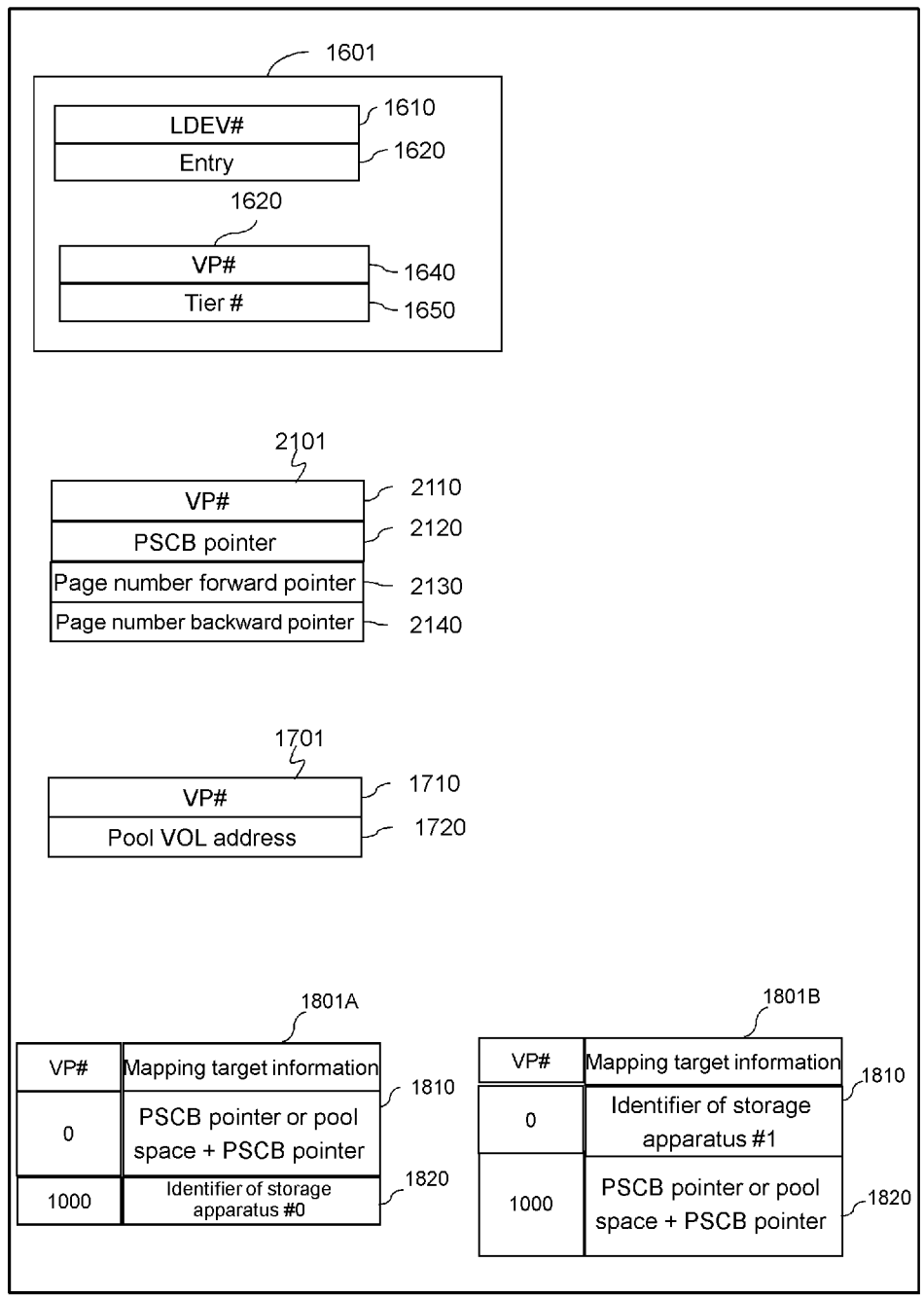
FIG. 14B illustrates an example of information stored in a memory 350 of a storage apparatus 121.

FIG. 14A illustrates an example of the relationship between TPVOLs and virtual pages. FIG. 14B illustrates an example of information stored in the memory 350 of the storage apparatus 121.

For the TPVOLs, a VS/VP mapping table 1601 is provided. A specific configuration example of the VS/VP mapping table 1601 is as shown in FIG. 14B. The VS/VP mapping table 1601 includes information indicating which virtual page is allocated to which virtual segment.

For example, the followings can be described.

(\*) When a virtual page is allocated to a virtual segment in a TPVOL, the corresponding mapping 231 between the virtual segment and the virtual page is registered in the VS/VP mapping table 1601.

(\*) Virtual pool page management information 1801 is indicative of the mapping relationship (mappings 232) between virtual pages and storage areas (PSCB (Pool Slot Control Block)) on the pool. The mapping relationship (mappings 233) between the PSCBs and physical storage areas is shown in a PSCB management information table 1701. The PSCB management information table 1701 includes information indicative of the configuration of an LDEV set for the pool 125.

(\*) A virtual pool is obtained by virtualizing one or more pools. A TPVOL is associated with the virtual pool. Virtual pages in the virtual pool with which the TPVOL is associated are allocated to the TPVOL. The virtual pages correspond to real pages into which the pool is partitioned to page by page in advance. Thus, data stored in a virtual segment in the TPVOL is actually stored in a real page corresponding to the virtual page allocated to the virtual segment. The data stored in a real page is stored in a storage area in the physical device 34 on which the real page are based.

(\*) The virtual pool 123 is provided in each of the storage apparatuses #0 and #1, which can hold the same information about the virtual pool 123. However, the storage apparatus may have information about a mapping relationship 232 for those virtual pages in a virtual page group 237 forming the virtual pool 123 to which the PSCBs in the storage apparatus are mapped but may not have information about the mapping relationship 232 for those virtual pages to which the PSCBs in the other storage apparatuses are mapped.

(\*) Configuration information on the TPVOL may be stored in the VS/VP mapping table 1601. The VS/VP mapping table 1601 may include an LDEV#1610 indicative of the LDEV number of the TPVOL corresponding to the table 1601, and an entry 1620 for each virtual segment.

(\*) The entry 1620 may include a VP#1640 that is the number of the virtual page allocated to the virtual segment corresponding to the entry and a tier #1650 that is the number of a tier including the virtual page. The tier #1650 may be provided if the virtual pool is of a layered type. The VP#1640 and tier # of a virtual segment may have invalid values or valid predetermined values if no page is allocated to the virtual segment.

(\*) The VP#s 237 of all the virtual pages may be provided in at least one of all the storage apparatuses that include virtual pools.

(\*) The virtual page management table 1801 indicates to which PSCB each virtual page is mapped or which pool contains the PSCB, and may be, for example, a part of the virtual pool table 3513. If a virtual page in the storage apparatus #0 is mapped to any PSCB in the storage apparatus #0, the corresponding information is registered in an area 1820. If a virtual page in the storage apparatus #0 is mapped to any PSCB in the different storage apparatus #1, the number and identifier of the storage apparatus #1 are registered in the area 1820. The address (pointer) of a PSCB pointer is stored in an area for mapping target information in the virtual page management information table 1801.

(\*) One or more free virtual pages are managed by a virtual page free queue 2320. If the virtual page is free (unallocated), the real page corresponding to the virtual page is also unused. An entry registered in the free queue 2320 (the entry corresponding to the virtual page) has a page number as information and includes a pointer to a virtual page information table 2101 which is indicative of the next slot. That is, entries corresponding to virtual pages are coupled together by the pointer preceding or succeeding each of the virtual pages. The storage apparatus 121 can determine an unused area in the pool 125 by passing through the virtual page free queue 2320 and based on a set of virtual pages coupled together by the pointers in the virtual page information table 2101.

(\*) The storage apparatus 121 sets a PSCB management information table 1701 corresponding to the LDEV (pool VOL) set for the pool 125. Specifically, PSCB management information tables 1701 may be set which corresponds to respective slots (real pages) in the LDEV set for the pool 125, and a virtual pool may then be set. The number of virtual pages required for the virtual pool may be equal to the number of PSCBs. Moreover, if a single pool is used into which a plurality of the storage apparatuses 121 are integrated together, the number of virtual pages may be equal to the number of PSCBs relating to the pools within the range of the integration (which correspond to all the LDEVs set for the pools 125 in the plurality of storage apparatuses 121). The PSCBs may correspond to the virtual pages on a one-to-one basis.

(\*) Moreover, a virtual page free queue 2320 is set. In an initial sate, all the pools 125 are unused, and thus a set of virtual pages coupled together by the virtual page free queue may include virtual pages corresponding to all the actual pages in the LDEV set for the pool 125. However, the virtual pages corresponding to the real pages in the pool of the storage device #0 may be managed by the virtual page free queue 2320 in the storage apparatus #0, and the virtual pages corresponding to the real pages in the pool of the storage device #1 may be managed by the different virtual page free queues 2320 in the storage apparatus #1.

(\*) The PSCB management information table 1701 includes information about the LDEV set for the pool 125. The PSCB management information table 1701 may be set for each real page in the pool 125.

(\*) The PSCB management information table 1701 includes a virtual page number 1710 that is the number of the virtual page to which the real page corresponding to the table 1701 is mapped, and a pool VOL address 1720 that is the address of the real page in the pool VOL.

When an I/O (write or read) to a virtual segment occurs, the real page corresponding to the virtual page allocated to the virtual segment can be determined based on virtual page information 1801 relating to the virtual page 237. Then, the site of the real page can be determined based on the PSCB #0 corresponding to the real page.

<Configuration of Virtual Pool>

The tier configuration of the virtual pool associated with the TPVOL is preferably the same among the plurality of storage apparatuses forming the storage system 111. If there is any difference in tier configuration, the difference is preferably as small as possible, in order to attain an equal I/O capability regardless of in which storage apparatus the TPVOL to which the host 101 issues the I/O command exists.

From this viewpoint, the tier configurations of the virtual pool described below are possible, for example.

<<First Tier Configuration>>

Figure 15:
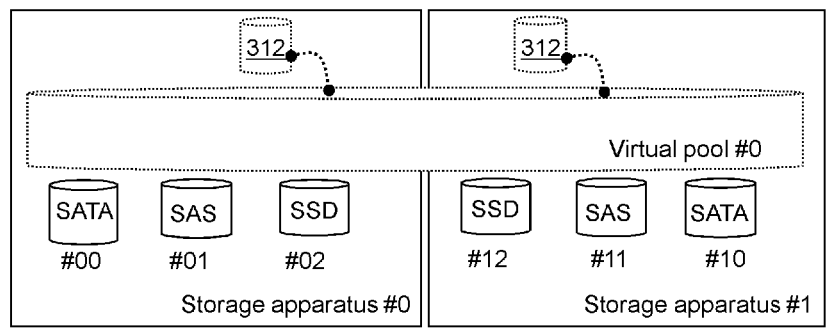
FIG. 15 is a diagram showing a first configuration of a virtual pool.

FIG. 15 shows a first configuration of the virtual pool.

A pool VOL group in the storage apparatus #0 and a pool VOL group in the storage apparatus #1 which form the virtual pool #0 are the same as for the configuration thereof (the capacities thereof can differ). Specifically, the pool VOL group in the storage apparatus #0 is composed of three pool VOLs, that is, a SATA VOL #00 (a VOL relying on the SATA HDD in the storage apparatus #0), a SAS VOL #01 (a VOL relying on the SAS HDD in the storage apparatus #0), and a SSD VOL #02 (a VOL relying on the SSD in the storage apparatus #0), whereas the pool VOL group in the storage apparatus #1 is composed of three pool VOLs, that is, a SATA VOL #10 (a VOL relying on the SATA HDD in the storage apparatus #1), a SAS VOL #11 (a VOL relying on the SAS HDD in the storage apparatus #1), and a SSD VOL #12 (a VOL relying on the SSD in the storage apparatus #1).

In this configuration, the storage apparatuses #0 and #1 can have the same tier configuration and the same I/O capability of each tier. Specifically, the tier configuration of the virtual pool #0 for the storage apparatus #0 is as follows: Tier #0: pool VOL (SSD VOL) #02 (corresponding to the type of the virtual page to which the real page in the pool VOL #02 is allocated);

Tier #1: pool VOL (SAS VOL) #01;
Tier #2: pool VOL (SATA VOL) #00;
Tier #3: pool VOL (SSD VOL) #12;
Tier #4: pool VOL (SAS VOL) #11; and
Tier #5: pool VOL (SATA VOL) #10.

For example, the tier configuration of the virtual pool #0 in the storage apparatus #1 is as follows:

Tier #0: pool VOL (SSD VOL) #12;
Tier #1: pool VOL (SAS VOL) #11;
Tier #2: pool VOL (SATA VOL) #10;
Tier #3: pool VOL (SSD VOL) #02;
Tier #4: pool VOL (SAS VOL) #01; and
Tier #5: pool VOL (SATA VOL) #00.

<<Second Tier Configuration>>

Figure 16:
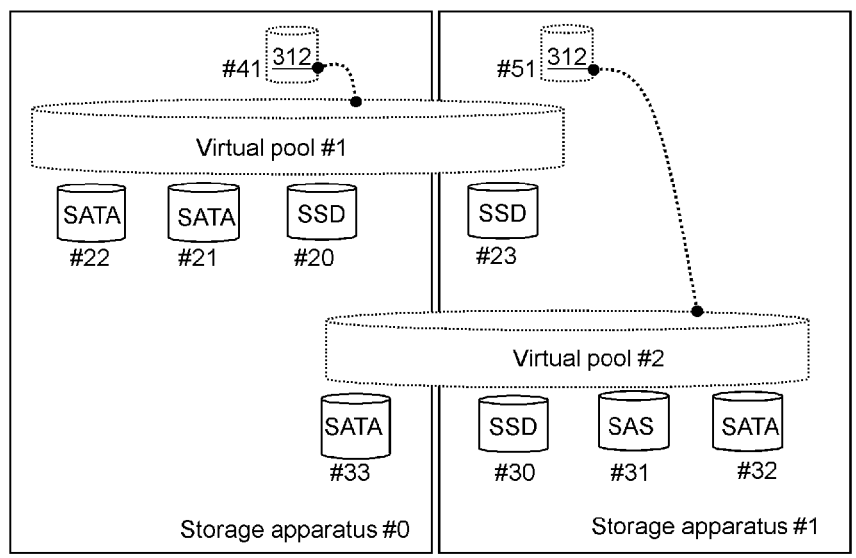
FIG. 16 is a diagram showing a second configuration of the virtual pool.

FIG. 16 shows a second configuration of the virtual pool.

Unlike the first configuration shown in FIG. 15, the configuration of the pool VOL group belonging to one virtual pool differs among the storage apparatuses, but a plurality of virtual pools are prepared, and the plurality of virtual pools have the same configuration to attain an equal I/O capability.

Specifically, for example, the virtual pool #1 is composed of tiers #0 to #3, the tier #0 corresponds to a pool VOL (SSD VOL) #20 in the storage apparatus #0, the tier #1 corresponds to a pool VOL (SAS VOL) #21 in the storage apparatus #0, the tier #2 corresponds to a pool VOL (SATA VOL) #22 in the storage apparatus #0, and the tier #3 corresponds to a pool VOL (SSD VOL) #23 in the storage apparatus #1. The virtual pool #2 is composed of tiers #0 to #3, the tier #0 corresponds to a pool VOL (SSD VOL) #30 in the storage apparatus #1, the tier #1 corresponds to a pool VOL (SAS VOL) #31 in the storage apparatus #1, the tier #2 corresponds to a pool VOL (SATA VOL) #32 in the storage apparatus #1, and the tier #3 corresponds to a pool VOL (SATA VOL) #33 in the storage apparatus #0.

The virtual pool #1 is associated with a TPVOL #41 in the storage apparatus #0, and the virtual pool #2 is associated with a TPVOL #51 in the storage apparatus #1.

The plurality of tiers in the virtual pool #1 associated with the TPVOL #41 in the storage apparatus #0 and the plurality of tiers in the virtual pool #2 associated with the TPVOL #51 in the storage apparatus #1 have an equal I/O capability. As a result, the TPVOL #41 and the TPVOL #51 are expected to have an equal I/O capability.

<<Third Tier Configuration>>

Figure 17:
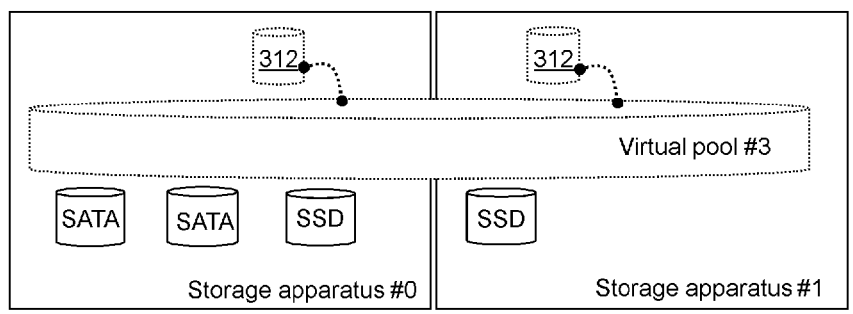
FIG. 17 is a diagram showing a third configuration of the virtual pool.

FIG. 17 shows a third configuration of the virtual pool.

As shown in FIG. 17, the third configuration differs from the first and second configurations in that the configuration of the virtual pool associated with the TPVOL differs between the storage apparatuses #0 and #1. In this case, the tiers and the VP types are correlated with each other so that the same tiers do not have significantly different I/O capacities. For example, the second tier in the virtual pool #3 in the storage apparatus #0 is associated with the SAS VOL in the storage apparatus #0, whereas the second tier in the storage apparatus #1 can be associated with the SSD VOL in the storage apparatus #0. When the storage apparatus #1 accesses the second tier, the storage apparatus #1 has to access the other storage apparatus #0, unlike the case where the storage apparatus #0 accesses the second tier. However, what is associated with the second tier in the storage apparatus #1 is a VOL relying on the SSD, which is a PDEV having a higher I/O capability. Therefore, the I/O capability of the storage apparatus #0 to access the second tier and the I/O capability of the storage apparatus #1 to access the second tier can be equal to each other.

<Write Processing>

Figure 18:
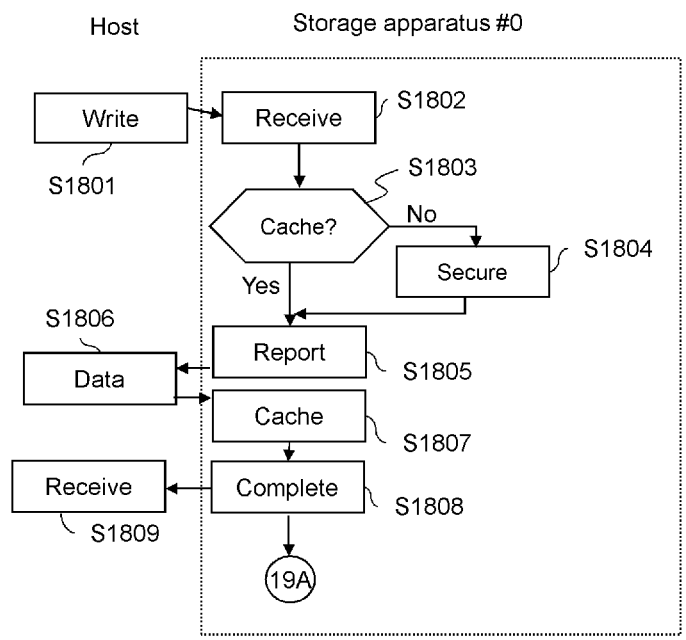
FIG. 18 is a diagram showing a part of a flow of a write process according to the embodiment.
Figure 19:
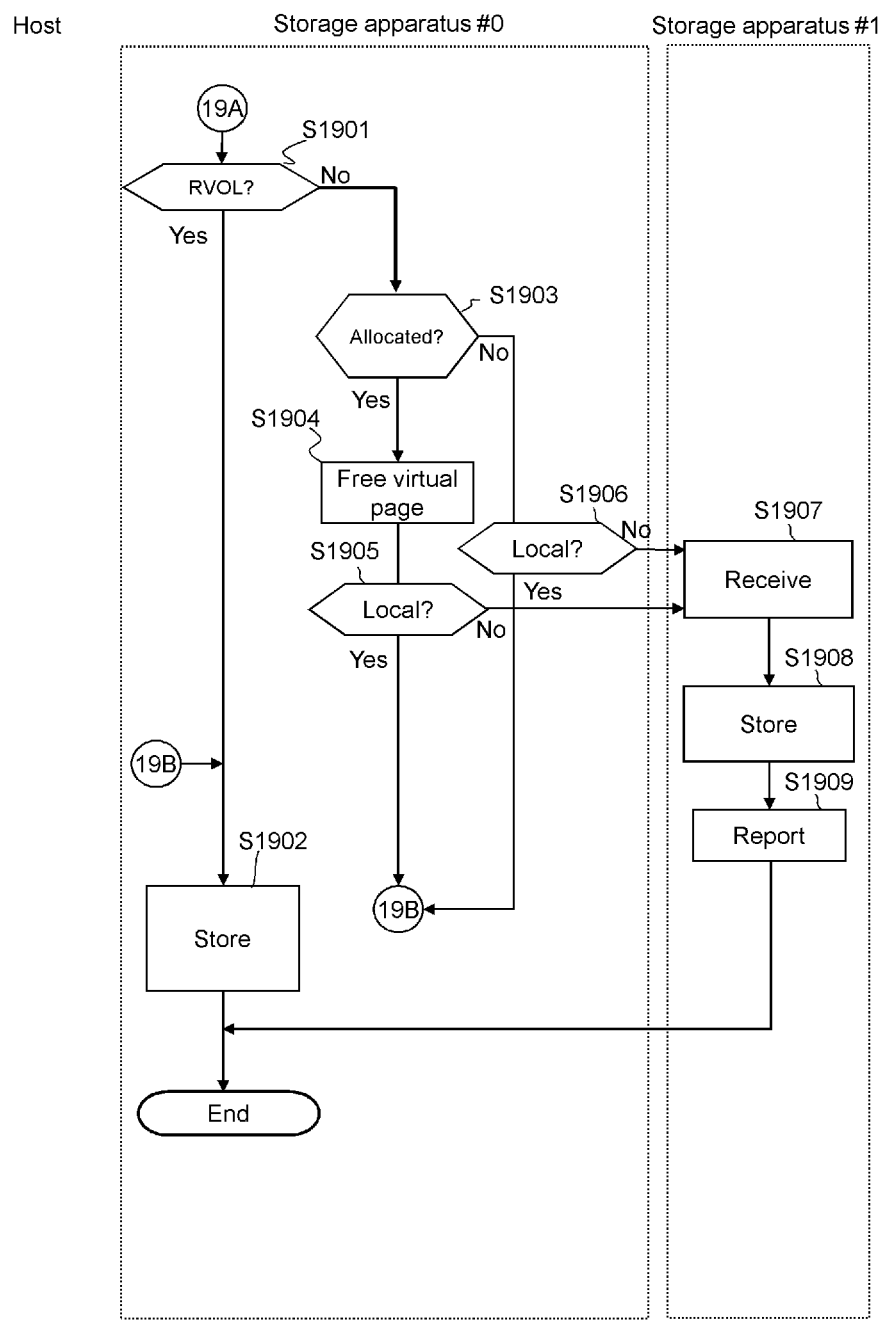
FIG. 19 is a diagram showing the remainder of the flow of the write process according to the embodiment.

FIGS. 18 and 19 show a flow of a write processing according to this embodiment.

As shown in FIG. 18, the host 101 issues a write command that specifies an LUN and a write-destination address (S1801), and an I/O program 3505 in a storage apparatus 121 in the storage system 111 receives the write command (S1802). In the following, it will be assumed that the storage apparatus 121 having received the write command is the storage apparatus #0. If there is no cache space secured for the write-destination address (if No in S1803), the I/O program 3503 (referred to as an I/O program #0 hereinafter) in the storage apparatus #0 secures a cache space in the cache memory 32 (S1804) and transmits a report to the host 101 (S1805).

The host 101 receives the report and transmits write-target data accompanying the write command to the storage apparatus #0 (S1806). The I/O program #0 writes the write-target data to the secured cache space (S1807) and transmits a completion report to the host 101 (S1808). The host 101 receives the completion report (S1809). After that, the host 101 can transmits a new I/O command.

Following S1809, as shown in FIG. 19, the I/O program #0 determines using the VOL table #0 whether the VOL determined from the LUN (GLDEV #) specified by the write command received in S1802 is an RVOL or not (S1901).

If the result of the determination in S1901 is positive (if Yes in S1901), the I/O program #0 writes the write-target data in the cache memory 32 to the space belonging to the address specified by the write command (S1902).

If the result of the determination in S1902 is negative (if No in S1901), the write-destination VOL is a TPVOL. The I/O program #0 refers to the VS/VP mapping table #0 corresponding to the write-destination TPVOL and determines whether or not a virtual page is allocated to the virtual segment belonging to the write-destination address (S1903).

If the result of the determination in S1903 is negative (if No in S1903), the I/O program #0 secures a free virtual page in the virtual pool (acquires the leading virtual page in a free queue) and allocates the secured virtual page to the write-destination virtual segment (S1904). That is, securing a virtual page may be securing a PSCB corresponding to that virtual page in a free queue. The virtual page can be secured according to a predetermined rule (a rule that the free virtual page is secured from the highest possible tier). The I/O program #0 can secure the free virtual page without recognizing which storage apparatus has the real page corresponding to the virtual page, although the I/O program #0 recognizes from which tier the virtual page is secured. The I/O program #0 associates the identification number of the allocated virtual page with the identification number of the write-destination virtual segment in the VS/VP mapping table #0 for the write-destination TPVOL and updates the status 902 of the allocated virtual page to "allocated". The I/O program #0 can update the access status 903 of the allocated virtual page (see FIG. 9).

Using the virtual pool table #0, the I/O program #0 determines whether or not the real page corresponding to the virtual page allocated in S1904 is a real page in the storage apparatus #0 (S1905).

If the result of the determination in S1905 is positive (if Yes in S1905), the I/O program #0 writes the write-target data in the cache memory to the real page corresponding to the virtual page allocated in S1904 (S1902).

If the result of the determination in S1905 is negative (if No in S1905), the I/O program #0 transmits a write command that specifies the address obtained by conversion of the write-destination address and the identification number of the virtual page allocated in S1904 and the write-target data in the cache memory to the storage apparatus #1 that has the real page corresponding to the virtual page allocated in S1904. An I/O program 3505 (referred to as an I/O program #1 hereinafter) in the storage apparatus #1 receives the write command (S1907), determines the real page corresponding to the virtual page allocated in S1904 using the virtual pool table #1, and updates the status 902 of the allocated virtual page to "allocated". The I/O program #1 writes the write-target data to the real page corresponding to the virtual page allocated in S1904 (S1908). The I/O program #1 transmits a write completion report to the storage apparatus #0. The write-target data may be stored in the cache memory 32 in the storage apparatus #1 before being written to the real page.

If the result of the determination in S1903 is positive (if Yes in S1903), that is, if a virtual page has already been allocated to the write-destination virtual segment, the same processing as in S1905 occurs in S1906. If Yes in S1906, the processing in S1902 occurs. If No in S1906, the processings in S1907 to S1909 occur.

<Read Processing>

Figure 20:
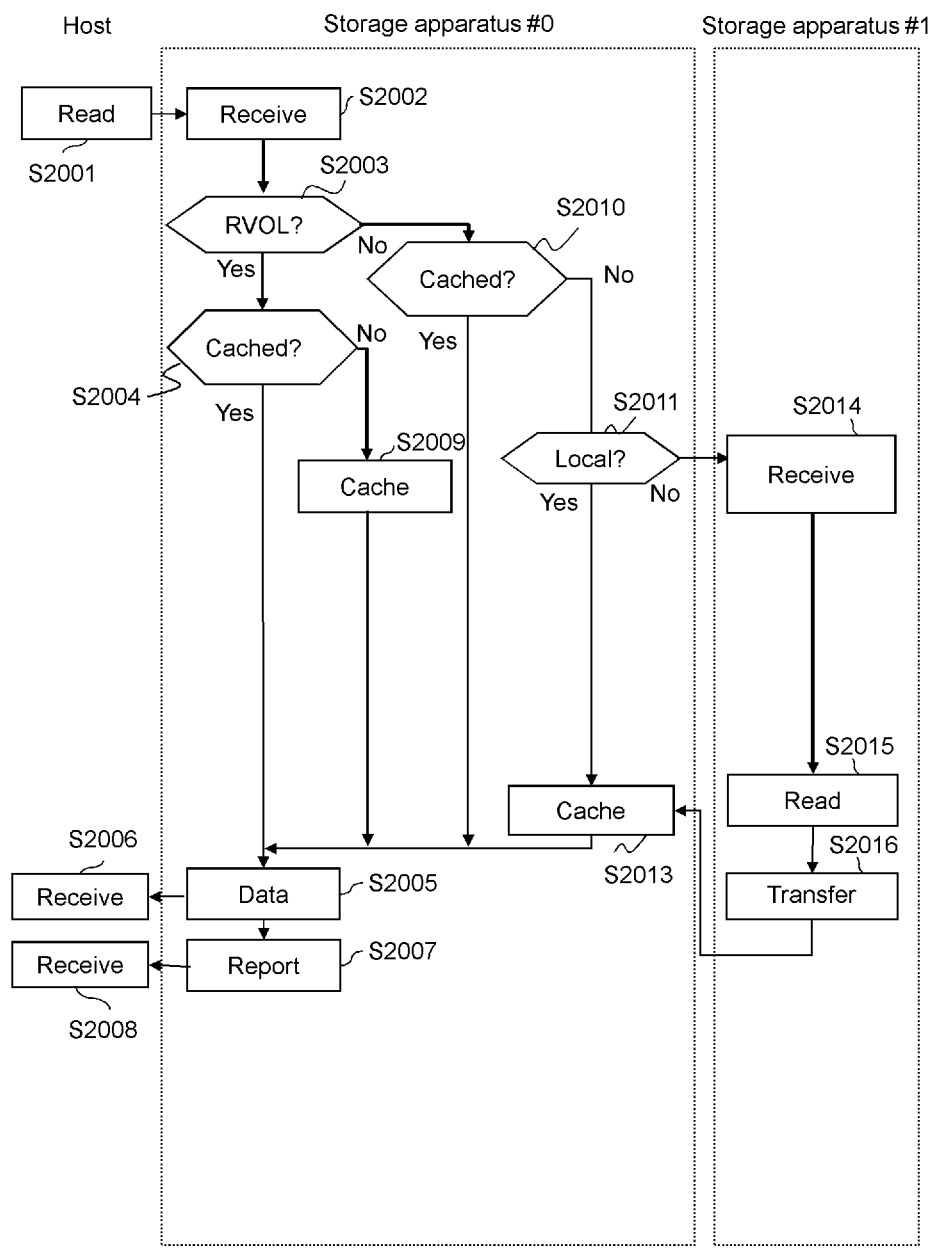
FIG. 20 is a diagram showing a flow of a read process according to the embodiment.

FIG. 20 shows a flow of a read processing according to this embodiment.

The host 101 issues a read command that specifies an LUN and a read-target address (S2001), and the I/O program 3505 in a storage apparatus 121 in the storage system 111 receives the read command (S2002). In the following, it will be assumed that the storage apparatus 121 having received the read command is the storage apparatus #0.

The I/O program 3505 in the storage apparatus #0 (referred to as an I/O program #0 hereinafter) determines using the VOL table #0 whether the VOL determined from the LUN (GLDEV #) specified by the read command is an RVOL or not (S2003).

If the result of the determination in S2003 is positive (if Yes in S2003), the I/O program #0 determines whether or not there is read-target data in the cache memory 32 (S2004).

If the result of the determination in S2004 is negative (if No in S2004), the I/O program #0 reads the read-target data from a space belonging to the read-target address and caches the data in the cache memory 32 (S2009). Following S2009 (or if Yes in S2004), the I/O program #0 transmits the read-target data in the cache memory 32 to the host 101 (S2005), and the host 101 receives the read-target data (S2006). Then, the I/O program #0 transmits a completion report to the host 101 (S2007), and the host 101 receives the completion report (S2008).

If the result of the determination in S2003 is negative (if No in S2003), the read-target VOL is a TPVOL. The I/O program #0 determines whether or not there is the read-target data in the cache memory 32 (S2010).

If the result of the determination in S2010 is positive (if Yes in S2010), the I/O program #0 performs the processings in S2005 and the following steps described above.

If the result of the determination in S2010 is negative (if No in S2010), the I/O program #0 refers to the VS/VP mapping table #0 corresponding to the read-target TPVOL to determine the virtual page corresponding to the virtual segment belonging to the read-target address, and refers to the virtual pool table #0 to determine, from the RP # corresponding to the determined virtual page, whether or not a real page corresponding to the determined virtual page exists in the storage apparatus #0 (S2011).

If the result of the determination in S2011 is positive (if Yes in S2011), the I/O program #0 reads the read-target data from the real page corresponding to the determined virtual page and writes the read read-target data to the cache memory 32 (S2013). The I/O program #0 performs the processings in S2005 and the following steps.

If the result of the determination in S2011 is negative (if No in S2011), the I/O program #0 transmits a read command that specifies the address obtained by conversion of the read-target address and the identification number of the determined virtual page to the storage apparatus #1 that has the real page corresponding to the virtual page. An I/O program 3505 in the storage apparatus #1 (referred to as an I/O program #1 hereinafter) receives the read command (S2014), use the virtual pool table #1 to determine the real page corresponding to the VP # (the identification number of the virtual page) specified by the read command, reads the read-target data from the determined real page (S2015), and transmits the read read-target data to the storage apparatus #0 (S2016). The data read in S2015 may be stored in the cache memory 32 in the storage apparatus #1 before S2016 occurs. The I/O program #0 stores the read-target data from the storage apparatus #1 in the cache memory 32 (S2103) and performs the processings in S2005 and the following steps.

<Migration of TPVOL>

Figure 21:
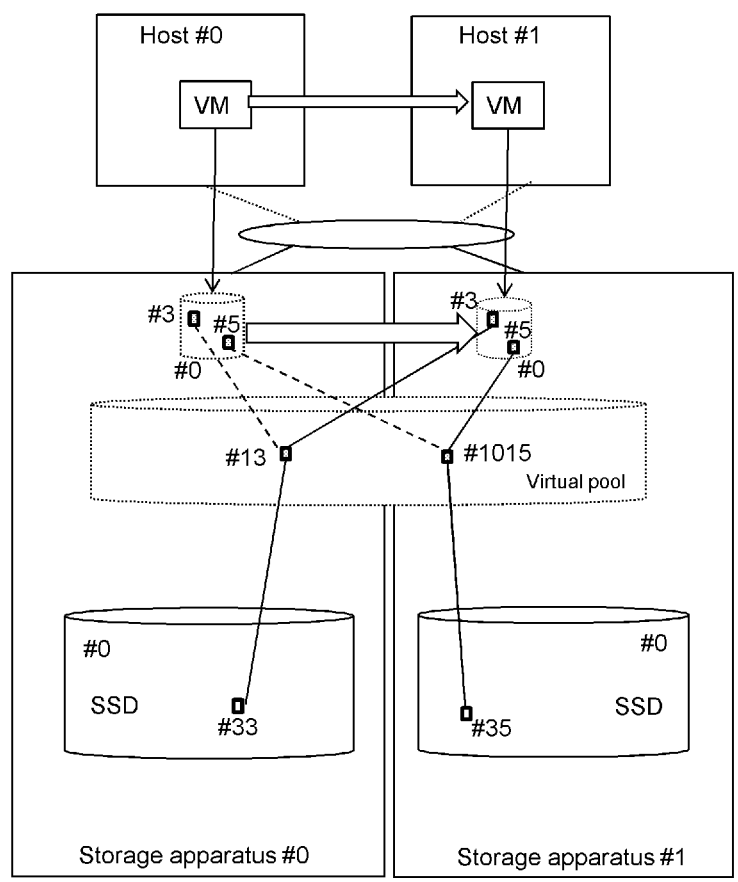
FIG. 21 is a diagram for schematically illustrating a part of a TPVOL migration process according to the embodiment.
Figure 22:
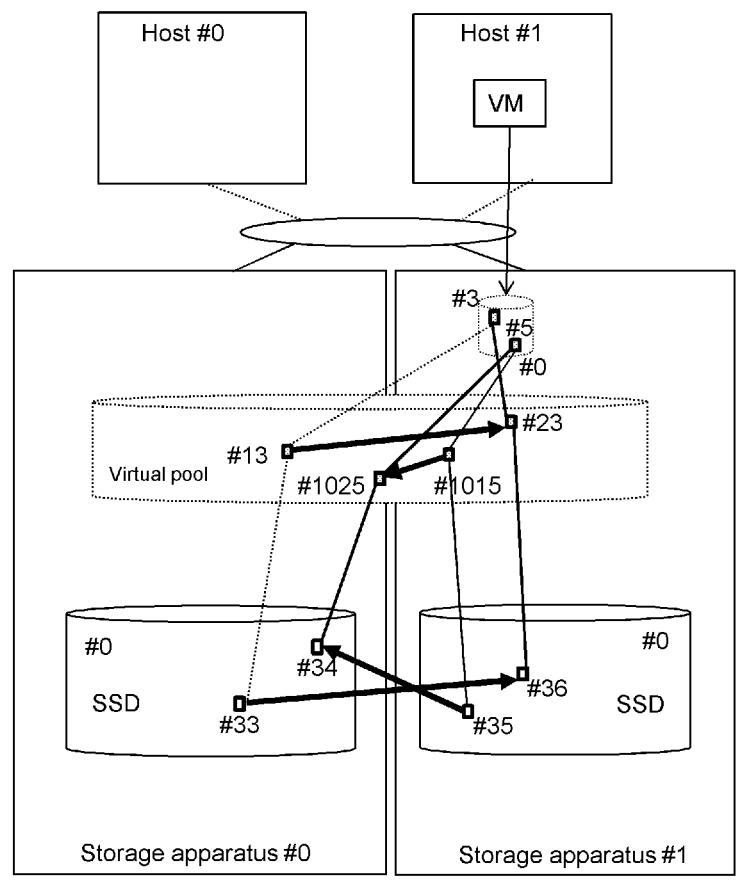
FIG. 22 is a diagram for schematically illustrating the remainder of the TPVOL migration process according to the embodiment.

FIGS. 21 and 22 schematically show a TPVOL migration process.

Migration of a TPVOL starts in response to a predetermined event. The predetermined event may be reception of an instruction from the management computer 20 by the storage apparatus 121 having the TPVOL or migration of a virtual computer (VM) that recognizes the TPVOL between hosts. In the latter case, the destination of the TPVOL can be the storage apparatus #1 that is accessed by the host #1 that is the destination of the VM.

It is assumed that a virtual page #13 is allocated to a virtual segment #3 in the TPVOL #0, and a virtual page #1015 is allocated to a virtual segment #5. It is further assumed that a real page #33 in the pool VOL (SSD VOL) #0 in the storage apparatus #0 is allocated to the virtual page #13, and a real page #35 in the pool VOL (SSD VOL) #1 in the storage apparatus #1 is allocated to the virtual page #1015. It is further assumed that the VP type to which the virtual page #13 belongs is associated with a first tier #0 in the storage apparatus #0 and with a second tier #1 in the storage apparatus #1. It is further assumed that the VP type to which the virtual page #1015 belongs is associated with a second tier #1 in the storage apparatus #0 and with a first tier #0 in the storage apparatus #1.

When the TPVOL #0 migrates from the storage apparatus #0 to the storage apparatus #1, the tiers to which the virtual pages #13 and #1015 allocated to the TPVOL #0 change, because the correlation between the VP types and the tiers differs between the storage apparatuses #0 and #1.

The pool control program 3507 in the storage apparatus #0 that is the source of the TPVOL #0 (referred to as a pool control program #0 hereinafter) transmits the VS/VP mapping table #0 and the tier table #0 (the correlation between the tier # and the VP type #) corresponding to the migration-target TPVOL #0 to the storage apparatus #1 that is the destination of the TPVOL #0. Each storage apparatus 121 can previously stores the tier table for each of the one or more other storage apparatuses 121. In this case, if the tier table for a storage apparatus is updated, each of the other storage apparatuses can update the tier table corresponding to the storage apparatus at a certain time (when the update occurs or when the update is found when the storage apparatus is checked for an update of the tier table, for example).

The pool control program 3507 in the storage apparatus #1 (referred to as a pool control program #1 hereinafter) receives the VS/VP mapping table #0 and the tier table #0 from the storage apparatus #0. The pool control program #1 compares the tier table #0 and the tier table #1 for each of the allocated virtual segment (allocated virtual page) in the migration-target TPVOL. In this way, the pool control program #1 determines in which real page in the storage apparatus #1 the data in the real page corresponding to the allocated virtual segment should be placed. The pool control program #1 migrates the data so that the data is placed in the determined real page. More specifically, for example, the pool control program #1 migrates data from the virtual page #13 to the virtual page #23 belonging to the page type corresponding to the tier #0 in the storage apparatus #1 so that the data in the virtual segment #3 belonging to the tier #0 in the storage apparatus #0 belongs to the tier #0 in the storage apparatus #1 (that is, data is migrated from the storage apparatus #0 to the storage apparatus #1). In addition, the pool control program #1 migrates data from the virtual page #1015 to a virtual page #1025 belonging to the page type corresponding to the tier #1 in the storage apparatus #1 so that the data in the virtual segment #5 belonging to the tier #1 in the storage apparatus #0 belongs to the tier #1 in the storage apparatus #1 (that is, data is migrated from the storage apparatus #1 to the storage apparatus #0).

In this way, the I/O capabilities of the tiers in which the data input to or output from the TPVOL is placed before and after migration of the TPVOL can be prevented from being significantly different.

In the example described above, the storage apparatus that is the destination of the TPVOL performs a relocation processing to change the place where the data input to or output from the TPVOL is to be placed to be suitable for the tier configuration of the destination storage apparatus. However, the storage apparatus that is the source of the TPVOL can perform the relocation processing. Alternatively, of the storage apparatus that is the source of the TPVOL and the storage apparatus that is the destination of the TPVOL, the storage apparatus that is more lightly loaded during the migration of the TPVOL can perform the relocation processing.

Although the relocation processing can be performed for each allocated virtual segment, the relocation processing can also be performed during the migration of the TPVOL or at a time after the migration of the TPVOL is completed. For example, if the I/O frequency of the virtual page allocated to the virtual segment is equal to or larger than a predetermined value (and/or if the data in the virtual page allocated to the virtual segment exists in the edge storage), the relocation processing for the virtual segment can be performed during the migration of the TPVOL, and if the I/O frequency of the virtual page allocated to the virtual segment is less than the predetermined value (and/or if the data in the virtual page allocated to the virtual segment exists in the core storage), the relocation processing for the virtual segment can be performed at a time after the migration of the TPVOL. The time after the migration of the TPVOL may be the time when the load on the storage apparatus that is the destination of the TPVOL becomes lower than a predetermined value, the time when a certain time zone is entered, or the time when the destination storage apparatus receives and processes the write command that specifies the address belonging to the allocated virtual segment (the time of reception of the write command), for example. In the case where the timing after the migration of the TPVOL is the time of reception of the write command, the I/O program #1 can perform the following processings of:

(*) reading data from a first virtual page allocated to the allocated virtual segment;

(*) updating the data with the write-target data;

(*) allocating a second virtual page belonging to the page type corresponding to the appropriate tier to the allocated virtual segment instead of the first virtual page (updating the VS/VP mapping table corresponding to the migration-target TPVOL); and (*) storing the updated data in the real page corresponding to the second virtual page.

Figure 23:
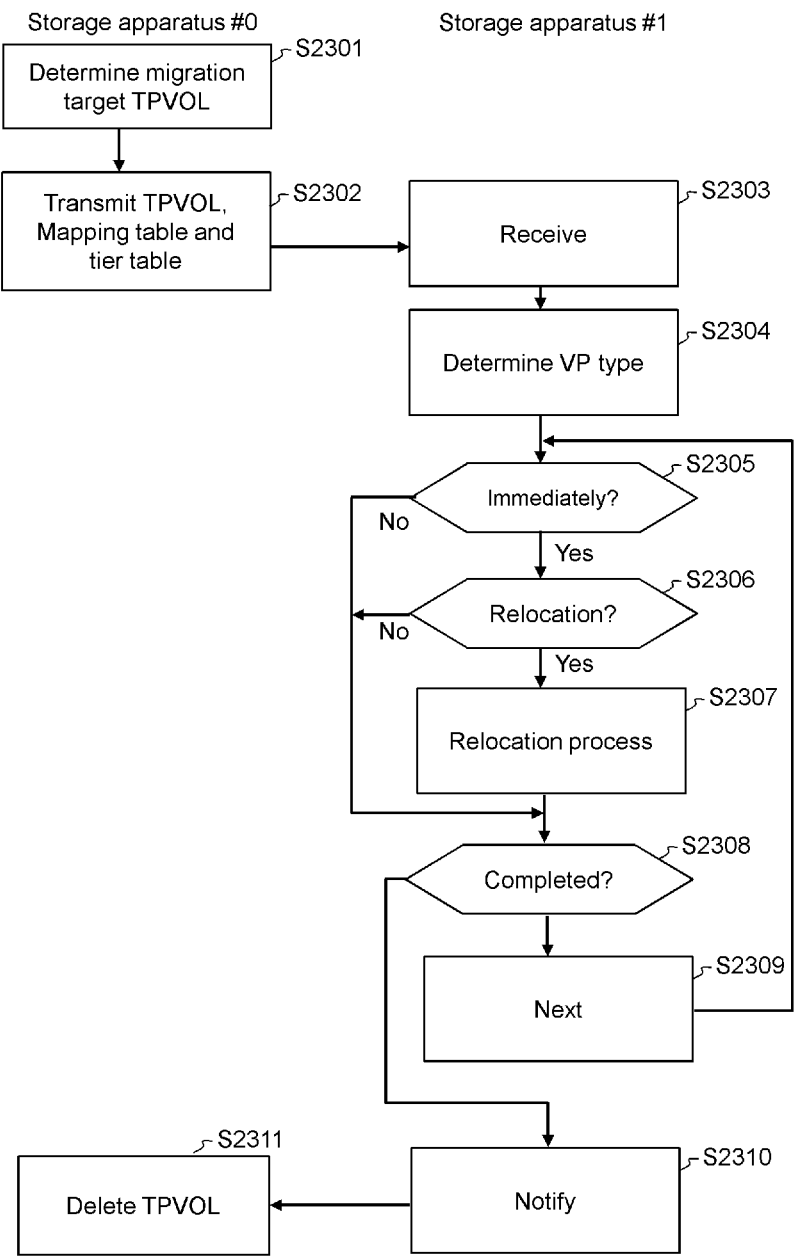
FIG. 23 is a diagram showing a flow of the TPVOL migration process.

FIG. 23 shows a flow of the TPVOL migration process.

The source storage apparatus #0 determines the migration-target TPVOL #0 and migrates the TPVOL #0 to the destination storage apparatus #1 (S2301).

The source storage apparatus #0 transmits the VS/VP mapping table #0 and the tier table #0 (the correlation between the tier # and the VP type #) corresponding to the TPVOL #0 to the destination storage apparatus #1 (S2302).

The destination storage apparatus #1 receives the VS/VP mapping table #0 and the tier table #0 from the storage apparatus #0 (S2303). The storage apparatus #1 compares the tier table #0 and the tier table #1, thereby determining the page type of the proper virtual page for the place where the data is to be placed for each allocated virtual segment (allocated virtual page) in the migration-target TPVOL (S2304).

The storage apparatus #1 determines whether or not to immediately perform the data relocation processing for a certain allocated virtual segment (S2305).

If the result of the determination in S2305 is positive (if Yes in S2305), the storage apparatus #1 determines whether or not the relocation processing is needed (whether or not the virtual page to be allocated to the allocated virtual segment needs to be changed to a virtual page belonging to another page type) (S2306).

If the result of the determination in S2306 is positive (if Yes in S2306), the storage apparatus #1 performs the relocation processing (a processing of changing the virtual page to be allocated to the allocated virtual segment to a virtual page belonging to another page type and migrating the data in the virtual page before the change to the virtual page after the change) (S2307).

The storage apparatus #1 determines whether or not there is an allocated virtual segment yet to be subjected to S2305 (S2308).

If the result of the determination in S2308 is positive (if Yes in S2308), the storage apparatus #1 selects the next allocated virtual segment (S2309) and performs the processing of S2305.

If the result of the determination in S2308 is negative (if No in S2308), the storage apparatus #1 transmits a predetermined notification to the storage apparatus #0 (S2310). If the storage apparatus #0 receives the notification, the storage apparatus #0 deletes the information concerning the TPVOL #0 from the VOL table #0, for example (S2311). Note that while the storage apparatus #1 (for example the pool control program #1) may release all of the virtual pages allocated to the source TPVOL at step S2311 before deleting information concerning the TPVOL #0, all of the virtual pages allocated to the source TPVOL have been released before S2311 because, in place of the source virtual pages allocated to the sources TPVOL, destination virtual pages are allocated to the destination TPVOL #0 in the relocation process described above.

The TPVOL migration process occurs as described above.

If the TPVOL #0 migrates as shown in FIG. 24, for example, in the destination storage apparatus, the TPVOL #0 can be associated with a lane #2 whose configuration is as closest to the configuration of a lane #1 with which the TPVOL #0 was associated in the source storage apparatus #0 as possible. The destination storage apparatus #1 can perform this association according to an instruction from the management computer 20, for example. When the lane associated with the TPVOL #0 changes from the lane #1 to the lane #2, data can be migrated from the virtual page corresponding to the real page in the lane #1 to the virtual page corresponding to the real page in the lane #2. The "lane" used herein refers to a data placement range (a migration range and a range of a source of allocated free virtual pages, for example) and is composed of one or more pool VOLs. The storage system 111 can have a plurality of lanes (#1 and #2, for example), and the virtual pool 123 can be a space comprising a plurality of lanes virtualized. In this embodiment, as described later, rebalancing is performed so that data is migrated to a place where the access status (the I/O frequency, for example) 903 of the virtual page and the tier condition 1202 of the tier are satisfied, and the data placement range can be limited to the lane associated with the TPVOL.

Figure 25A:
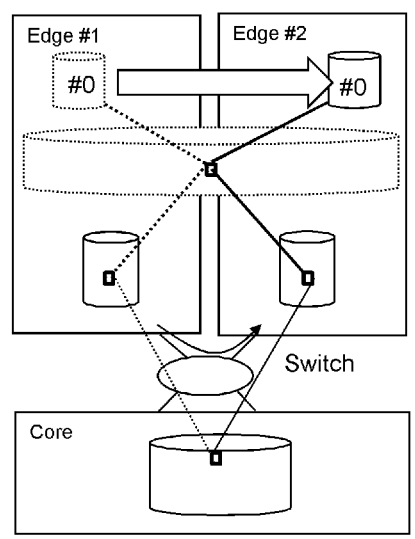
FIG. 25A is a diagram showing an example of a process performed in the TPVOL migration process.
Figure 25B:
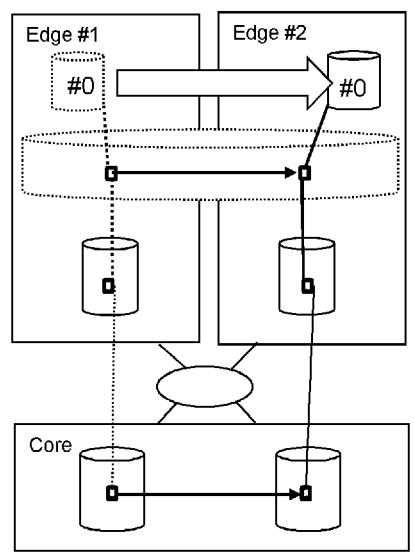
FIG. 25B is a diagram showing an example of the process performed in the TPVOL migration process.

For example, as shown in FIG. 25A, if the data in the real page corresponding to the virtual page allocated to the migration-target TPVOL #0 is actually stored in the core storage (external storage apparatus), and the tiers to which the virtual page allocated to the TPVOL #0 belongs have the same identification number in the source and the destination, the data migration is not necessary. For example, as shown in FIG. 25B, if the identification number of the tier to which the virtual page allocated to the TPVOL #0 belongs changes, but the actual storage site is in the core storage both in the source and the destination, the data is copied in the core storage, and the identification number of the virtual page associated with the virtual segment in the source storage apparatus #1 (edge storage) can be changed.

<Rebalancing>

Rebalancing means data relocation. Each storage apparatus 121 (the pool control program 3507, for example) can perform rebalancing. A storage apparatus #0 can start rebalancing in response to at least one of the following events:

(*) the utilization of the pool #0 in the storage apparatus #0 (the ratio of the total capacity of the real pages corresponding to the allocated virtual pages to the capacity of the pool #0) becomes higher than a first threshold, and the utilization of the virtual pool comprising one or more pools virtualized including the pool #0 (the ratio of the total capacity of the allocated virtual pages to the capacity of the virtual pool) becomes higher than a second threshold (in this case, pool VOLs may be added to the pool #0 or the number of free pages may be increased by deletion of pool VOLs or recovery of pages);

(*) the storage apparatus #0 receives an instruction for rebalancing from the management computer 20; and (*) a virtual page for which the tier condition 1202 does not agree with the access status 903 is detected.

In the following, an example of the purpose and the effect of the rebalancing will be described.

Figure 26:
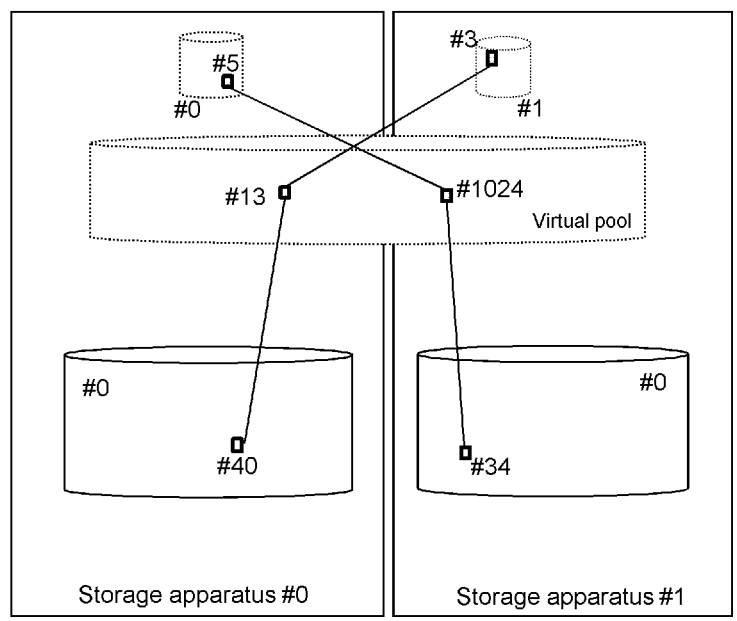
FIG. 26 is a diagram showing an example of a condition before start of rebalancing according to the embodiment.

As shown in FIG. 26, it is assumed that a virtual page #1020 is allocated to the virtual segment #5 in the TPVOL #0 in the storage apparatus #0, and the virtual page #1020 corresponds to a real page #40 in the storage apparatus #1. It is further assumed that a virtual page #104 is allocated to the virtual segment #3 in the TPVOL #1 in the storage apparatus #1, and the virtual page #104 corresponds to a real page #34 in the storage apparatus #0.

In this situation, the storage apparatuses need to communicate with each other both when an I/O to the virtual segment #5 in the TPVOL #0 occurs and when an I/O to the virtual segment #3 in the TPVOL #1 occurs. Such a situation (referred to as an intersection situation hereinafter) can be detected by each storage apparatus transmitting the VS/VP mapping table 1601 to and receiving the VS/VP mapping table 1601 from the other storage apparatus or by the management computer receiving the VS/VP mapping table 1601 from each storage apparatus. The management computer stores information concerning which real page in which storage apparatus corresponds to each virtual page and can detect the intersection situation based on the information and the VS/VP mapping tables.

When the intersection situation is detected, the storage apparatus #0 or #1 that has the real page that stores the data concerning the intersection situation interchanges data between the virtual pages #1020 and #104. In this way, data is interchanged between the real page #34 in the storage apparatus #0 and the real page #40 in the storage apparatus #1.

Figure 27:
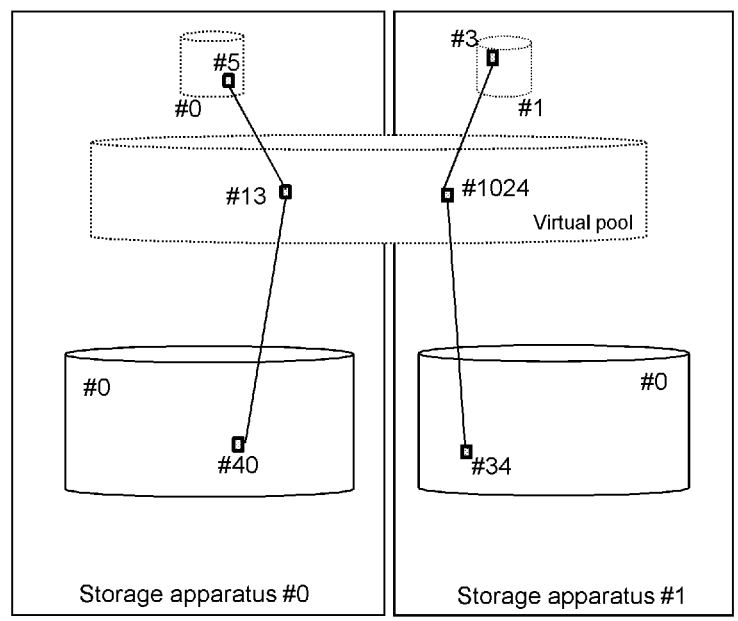
FIG. 27 is a diagram showing an example of a condition after completion of rebalancing according to the embodiment.

As a result, as shown in FIG. 27, the intersection situation described above is resolved. Therefore, the I/O capability of the virtual segment #5 in the TPVOL #0 and the I/O capability of the virtual segment #3 in the TPVOL #1 can be improved.

Figure 28:
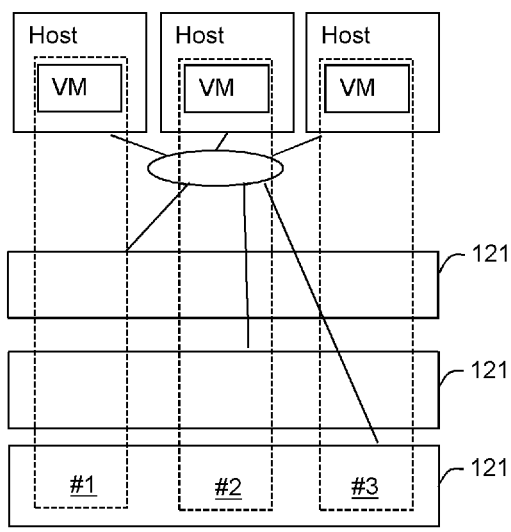
FIG. 28 is a diagram showing an example of a data migration range in rebalancing.
Figure 29:
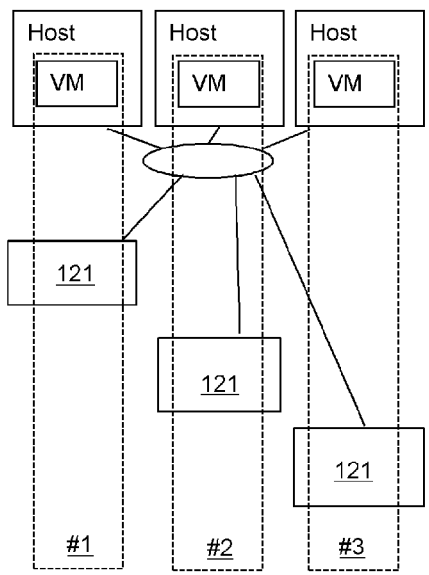
FIG. 29 is a diagram showing an example of the data migration range in rebalancing.

The data migration range of the rebalancing can be limited. The data migration range can be expressed based on the concept of lane described above. The lanes may be configured so that each lane is provided over two or more storage apparatuses that manage the virtual pool as shown in FIG. 28 or so that each lane is limited to the pool in one storage apparatus as shown in FIG. 29. In the example shown in FIG. 29, the TPVOL can be associated with lanes limited to the pool in the storage apparatus that has the TPVOL.

<Release of Virtual Page>

In this embodiment, a virtual page is allocated from a virtual pool to a virtual segment in a TPVOL.

Figure 30A:
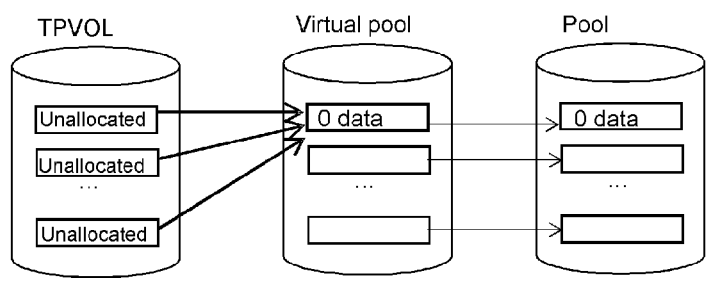
FIG. 30A is a diagram showing an example of a relationship between unallocated virtual segments and virtual pages.

An unallocated virtual segment refers to a virtual segment to which no virtual page is allocated and, according to this embodiment, can also refer to a virtual segment to which a dedicated virtual page that stores 0 data (referred to as a 0 data virtual page hereinafter) is allocated as shown in FIG. 30A. The 0 data virtual page can refer to a virtual page allocated to a dedicated real page that stores 0 data (referred to as a 0 data real page hereinafter). The "0 data" refers to data all the bits of which are 0 and is an example of dummy data. Although there is one 0 data virtual page in this embodiment, there can be two or more 0 data virtual pages. The same 0 data virtual page is allocated to all the unallocated virtual segments. Therefore, when the storage apparatus 121 receives a read command that specifies an address belonging to an unallocated virtual segment from the host 101, the storage apparatus 121 reads the 0 data from the 0 data real page corresponding to the 0 data virtual page allocated to the virtual segment and transmits the 0 data to the host 101.

Figure 30B:
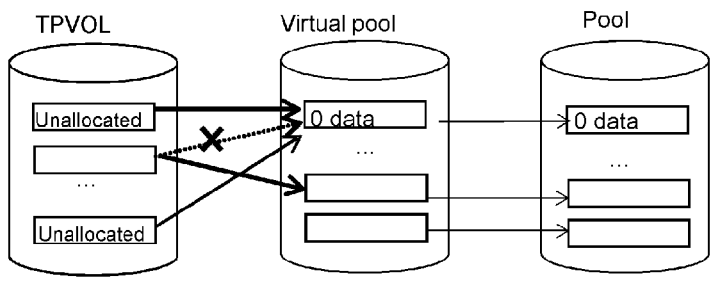
FIG. 30B is a diagram showing that a free virtual page is allocated when a write to an unallocated virtual segment occurs.

When a write to an unallocated segment occurs, the storage apparatus 121 (the I/O program 3505, for example) allocates a free virtual page that is not the 0 data virtual page to the unallocated segment as shown in FIG. 30B.

Figure 30C:
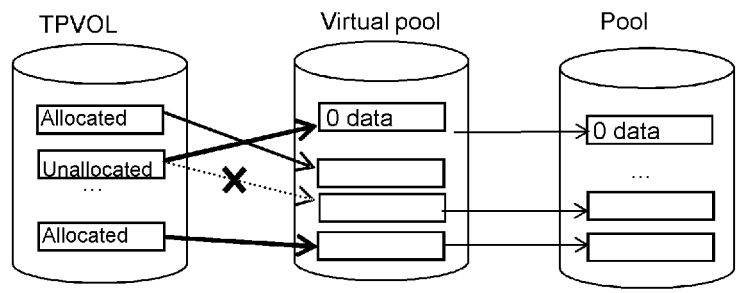
FIG. 30C is a diagram showing an example of a process performed when a virtual page allocated to a virtual segment is released.

In the case where an allocated virtual page is turned into a free virtual page for the reason that the TPVOL to which the virtual page has been allocated is deleted or other reasons (that is, when an allocated virtual page becomes a target of restoration to a free virtual page), the storage apparatus 121 (the pool control program 3507, for example) performs the following processings of:

(*) writing 0 data to the real page corresponding to the restoration-target virtual page;

(*) change the status 902 of the restoration-target virtual page from "allocated" to "available";

(*) placing the restoration-target virtual page back to the bottom of the virtual page free queue; and (*) allocating a 0 data virtual page to the virtual segment to which the restoration-target virtual page has been allocated as shown in FIG. 30C.

That is, the restoration-target virtual page may be a virtual page the allocation of which to an allocated virtual segment has been released but in which data is stored. Since writing 0 data into the virtual page enables the virtual page to be newly allocatable, a PSCB corresponding to that virtual page may be included in a virtual page free queue.

<Correlation Between Virtual Page and Real Page>

The I/O capability can be improved depending on which real page in which storage apparatus is associated with which virtual page.

Figure 31A:
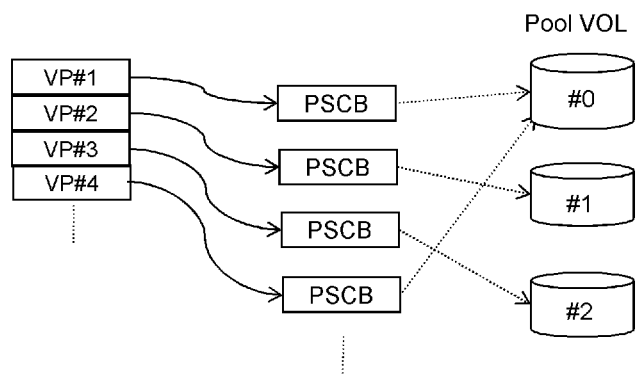
FIG. 31A is a diagram showing an example of N real pages allocated to N virtual pages having successive addresses (N represents an integer equal to or larger than 2).
Figure 31B:
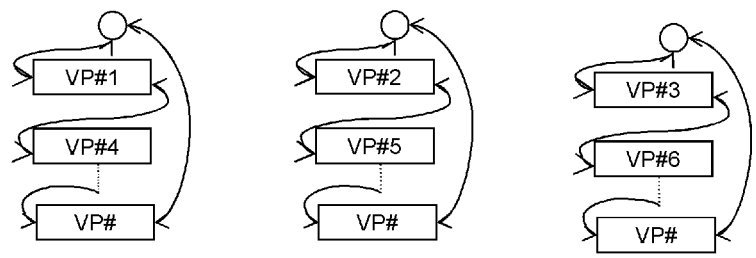
FIG. 31B is a diagram for illustrating an example of management of free virtual pages using N free queues.

For example, to N (N represents an integer equal to or larger than 2) virtual pages having successive addresses, N real pages from N pool VOLs in different VDEVs (RAID groups or EDEVs, for example), rather than N real pages from the same pool VOL, are allocated, as shown in FIG. 31A. As a result, even if sequential writes to the N virtual pages having successive addresses occur, the accesses can be prevented from being concentrated on one VDEV. In this case, there can be N free queues as shown in FIG. 31B.

This embodiment will be further described below. Some parts of the following description overlap the forgoing description.

Figure 34:
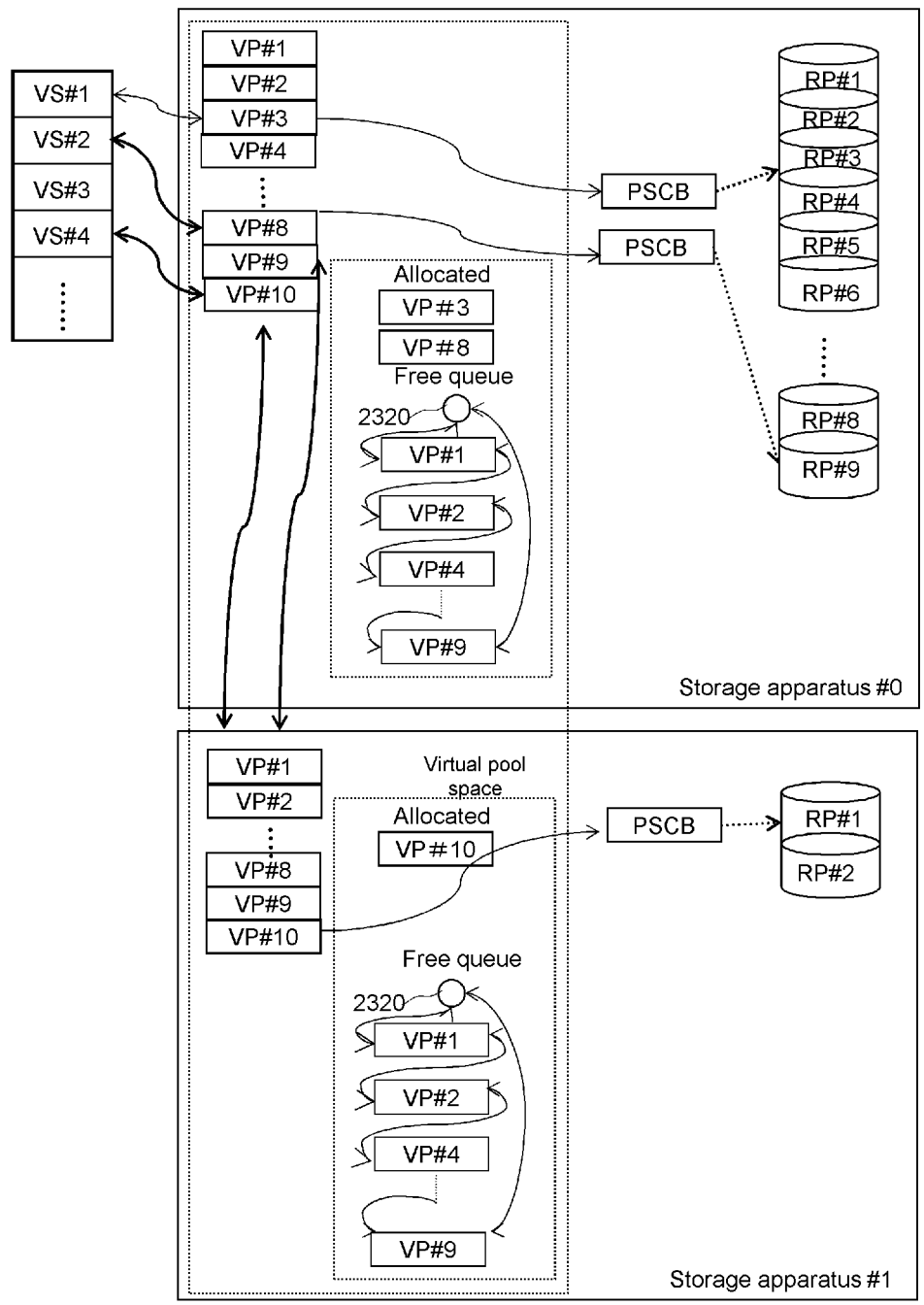
FIG. 34 illustrates a first example of virtual pool management.

FIG. 34 illustrates a first example of virtual pool management.

Both of storage apparatuses #0 and #1 manage all of the virtual pages constituting a virtual pool. It is assumed in FIG. 34 that the virtual pages constituting the virtual pool are virtual pages #1 to #10. Virtual page numbers are unique within one virtual pool.

The virtual pages #1 to #8 among the virtual pages #1 to #10 correspond to eight real pages in a pool in the storage apparatus #0 and the virtual pages #9 and 10 correspond to two real pages in a pool in the storage apparatus #1. The storage apparatus #0 can identify the correspondence by referring to a virtual pool table #0 (see FIG. 9) and a VP management table #0 (see FIG. 10). Similarly, the storage apparatus #1 can identify the correspondence by referring to a virtual pool table #1 and a VP management table #1.

Each of the storage apparatuses #0 and #1 has a queue of the virtual pages #1 to #10 (virtual page free queue). In each of the storage apparatuses #0 and #1, a controller 31 (for example the I/O program 3505 or the pool control program 3507) dequeues a free virtual page from the free queue when the free virtual page is to be allocated to any of the virtual segments.

In the example in FIG. 34, the virtual pages #3, #8 and #10 are allocated to virtual segments.

A flow of allocation of a virtual page to a write-destination virtual segment will be described below. In the description, reference is made to FIG. 19 as appropriate.

If the result of the determination in S1903 of FIG. 19 is negative (No in S1903), that is, if a virtual page has not been allocated to a write-destination virtual segment, S1904 through S1901 are performed. More specifically, the following process is performed.

The I/O program #0 secures, in the virtual pool, a free virtual page to be allocated to the write-destination virtual segment. The I/O program #0 refers to the virtual pool table #0 (see FIG. 9) and the VP management table #0 (see FIG. 10) to determine whether or not the secured virtual page corresponds to a real page in the storage apparatus #0.

If the result of the determination is positive, the I/O program #0 confirms that the PSCB corresponding to the virtual page has not been taken by anyone, that is, the PSCB is free. A virtual page management scheme in FIG. 34 provides the PSCB 1701 with an excluding lock indicating whether or not the PSCB has been secured. If the lock is released, the PSCB is determined to have been secured. The excluding lock avoids the following situation even if the storage apparatus #0 and the storage apparatus #1 hold the same virtual page free queue and simultaneously secure the same free virtual page: a real area that is the PSCB coupled to the virtual page is secured to allow the program to determine that the virtual page has been really secured, and thus the different storage apparatuses allot the same virtual page to virtual segments in the respective TPVOLs.

The I/O program #0 removes the secured virtual page #6 from the virtual page free queue 2320 and couples the virtual page #6 to an allocated page queue. The I/O program #0 writes the write-target data to the real page corresponding to the secured virtual page #6. The allocated page queue is a queue in which allocated virtual pages (the entries corresponding to the virtual pages) are coupled together and may be provided in a storage apparatus with a free queue.

On the other hand, if the result of the determination is negative, the I/O program #0 sends a query to a different storage apparatus (for example #1) that has a real page corresponding to the secured virtual page (for example #9). The query may ask whether the virtual page #9 is available or not. That different storage apparatus #1 receives the query and determines whether or not the virtual page #9 is available. Lock control similar to that described above may be performed depending on the management scheme used.

If the virtual page #9 is available, the I/O program #1 on the different storage apparatus #1 sets the status of the virtual page #9 to "allocated" (dequeues the entry corresponding to the virtual page #9 from the free queue) and transmits a reply indicating the securement of the virtual page #9 to the storage apparatus #0. The storage apparatus #0 receives the reply and the I/O program #0 allocates the virtual page #9 to the write-destination virtual segment. The I/O program #0 transmits write-target data to the storage apparatus #1 which has the real page corresponding to the virtual page #9. The storage apparatus #1 receives the data, stores the data in the real page corresponding to the virtual page #9, and transmits the report of the completion of the storage to the storage apparatus #1.

If the virtual page #9 has already been allocated, the I/O program #1 on the different storage apparatus #1 may search for a free virtual page that corresponds to a real page in the storage apparatus #1, and may transmits a replay indicating a found page (for example #10) to the storage apparatus #0. The storage apparatus #0 may receive the replay and the I/O program #0 may allocate the virtual page #10 specified in the replay to the write-destination virtual segment. The I/O program #0 may transmit the write-target data to the storage apparatus #1 that has a real page corresponding to the virtual page #10, and the storage apparatus #1 may receive the data, store the data in the real page corresponding to the virtual page #10, and transmit a report of the completion of the storage to the storage apparatus #1.

When receiving a write command, the I/O program #0 may determine a storage apparatus that has a real page including a virtual page to be selected as a virtual page to which the write-destination virtual segment is to be allocated (the I/O program #0 may also consider in which tier a virtual page is to be selected). For example, the I/O program #0 may select preferentially a virtual page corresponding to a real page in a storage apparatus that is at a shorter distance from the storage apparatus #0. For example, if three or more storage apparatuses are cascaded (coupled with one another in series), the storage apparatus #0 is at one end, the storage apparatus #1 is next to the storage apparatus #0, the storage apparatus #2 is next to the storage apparatus #1 and the storage apparatus #0 receives a write command, then a virtual page corresponding to a real page in the storage apparatus #0 may be preferentially selected as a virtual page to be allocated to the write-destination virtual segment. If there is not a free virtual page corresponding to a real page in the storage apparatus #0, a virtual page corresponding to a real page in the storage apparatus #1 which is nearest to the storage apparatus #0 may be selected. If there is not a virtual page corresponding to a real page in the storage apparatus #1, a virtual page corresponding to a real page in the storage apparatus #2 next to the storage apparatus #1 may be selected. Note that the level of the tier may be determined by taking into consideration the transfer performance that depends on how many storage apparatuses the access will go through, in addition to the performance of access to a real page corresponding to a virtual page (the access performance of a physical storage device on which the real page is based).

The foregoing is a description of the first example of virtual pool management and an example of flow of allocating a virtual page to a write-destination virtual segment.

Another example of virtual pool management can be conceived.

Figure 35:
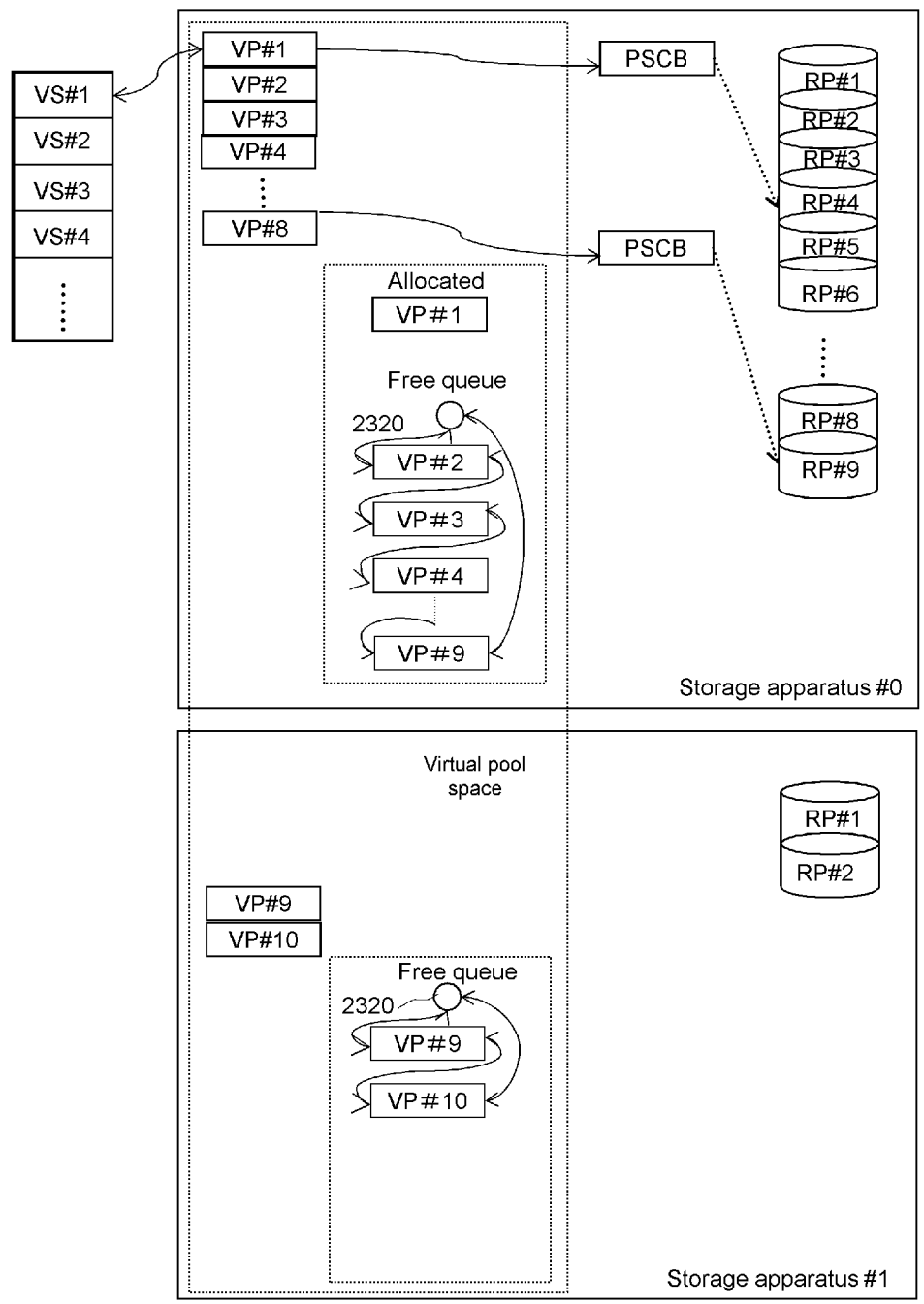
FIG. 35 illustrates a second example of virtual pool management.

FIG. 35 illustrates a second example of virtual pool management.

Instead of each of the storage apparatuses #0 and #1 managing all virtual pages (the entries of all virtual pages), each of the storage apparatuses #0 and #1 may manage only virtual pages corresponding to real pages that are local to that storage apparatus (only entries (PSCBs) relating to virtual pages corresponding to real pages local to the storage apparatus).

In that case, the I/O program #0 sends a query to a different storage apparatus #1 when allocating a virtual page of the different storage apparatus (for example when all of the virtual pages #1 to #8 have been allocated). The query may ask whether or not there is a free virtual page. When the different storage apparatus #1 receives the query, the I/O program #1 may secure a free virtual page, if there is any (for example if there is a virtual page #9 available), and may transmit a replay indicating the securement of the virtual page #9 to the storage apparatus #0. When the storage apparatus #0 receives the reply, the I/O program #0 may allocate the virtual page #9 to a write-destination virtual segment.

Figure 36:
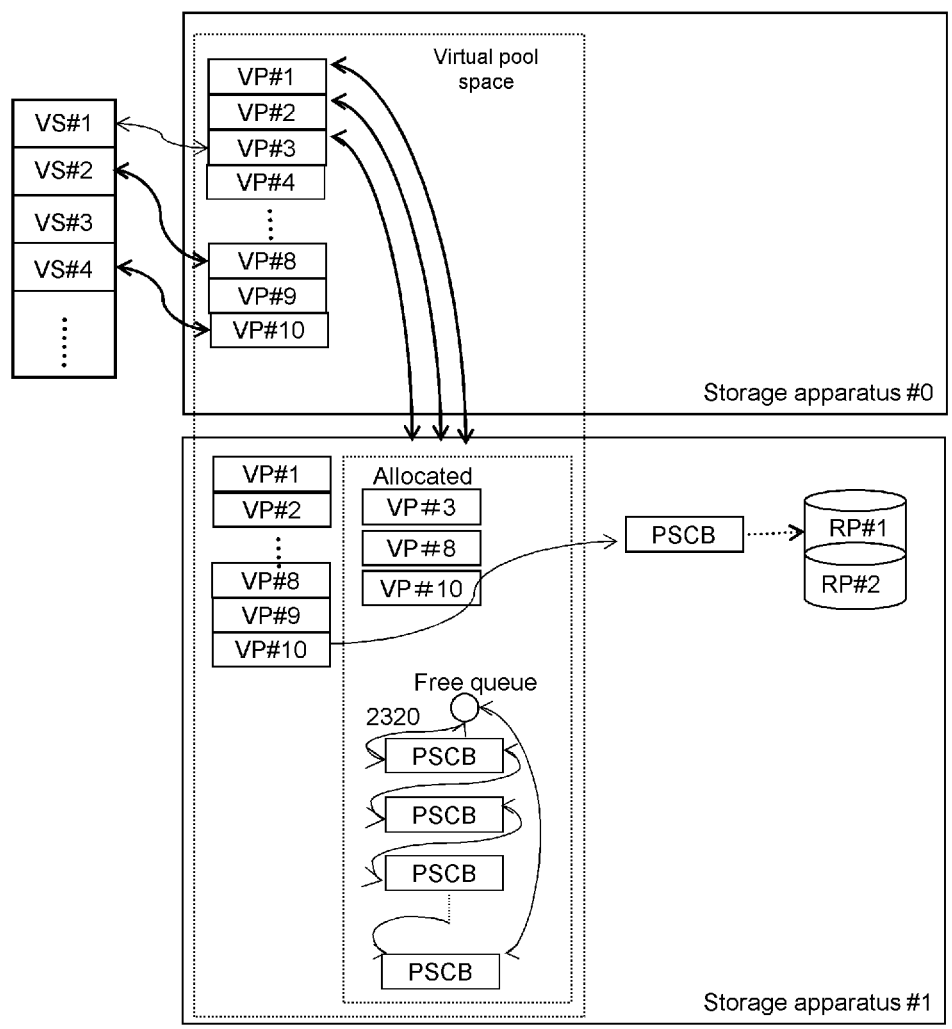
FIG. 36 illustrates a third example of virtual pool management.

FIG. 36 illustrates a third example of virtual pool management.

The storage apparatus #0 does not have a pool on which a virtual pool is based whereas the storage apparatus #1 has a pool on which the virtual pool is based. However, the storage apparatus #0 manages virtual pages #1 to #10.

The flow of allocation of a virtual storage may be the same as that described above. That is, when allocating any of the virtual pages (for example a virtual page #0), the I/O program #0 sends a query to the storage apparatus #1. The query may ask whether the virtual page #0 is available or not. When the storage apparatus #1 receives the query, the I/O program #1 may secure the virtual page #0 if available, and may transmit a reply indicating the securement of the virtual page #0 to the storage apparatus #0. When the storage apparatus #0 receives the reply, the I/O program #0 may allocate the virtual page #9 to a write-destination virtual segment.

Figure 37:
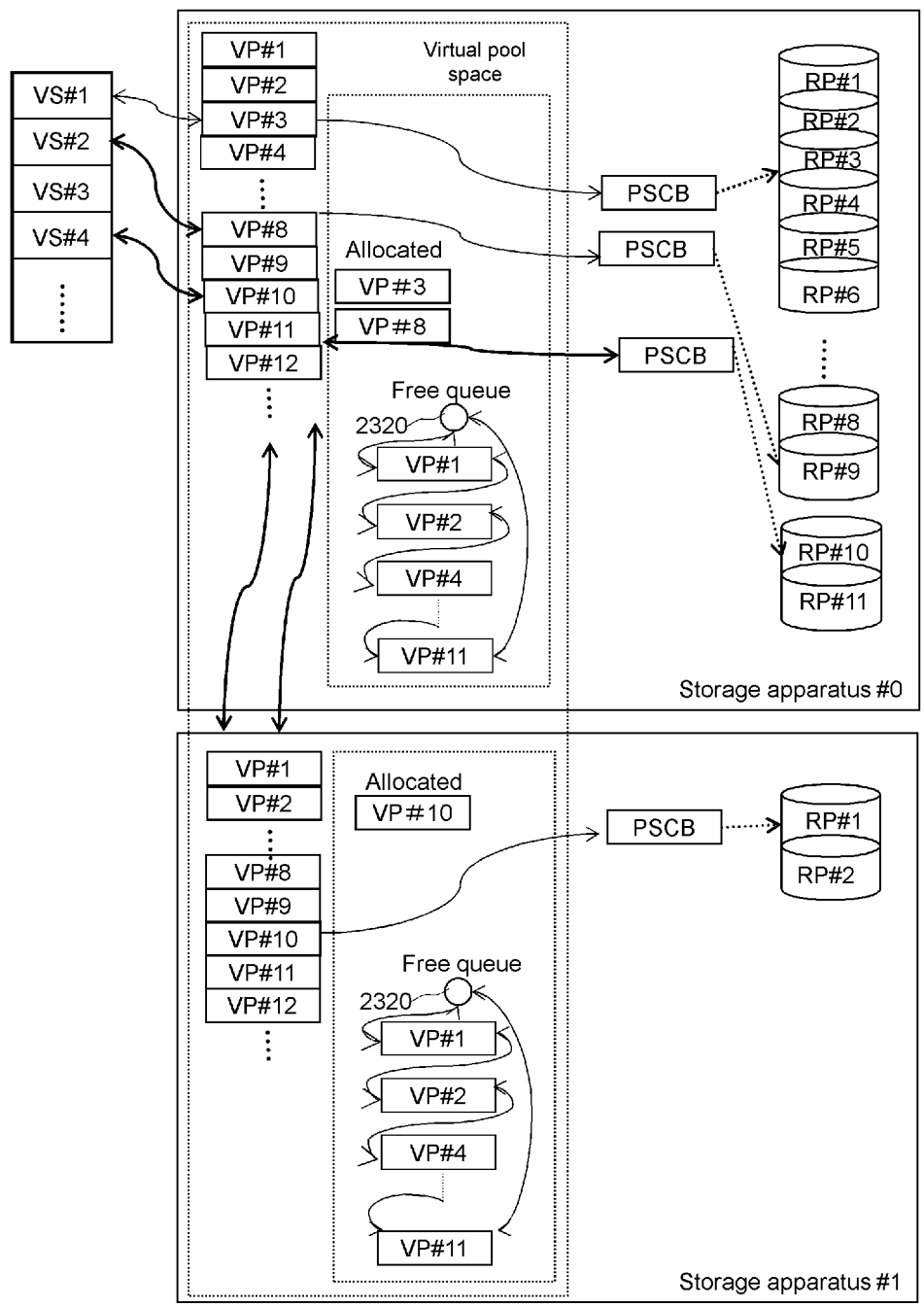
FIG. 37 is a diagram illustrating a process performed for adding a pool VOL on which the virtual pool is based.

FIG. 37 is a diagram illustrating a process performed for adding a pool VOL on which a virtual pool is based.

When a pool VOL (for example a pool including real pages #10 and #11) is added to the storage apparatus #0, a controller #0 (for example the pool control program #0) performs the following process.

(X1) The controller #0 creates PSCBs as many as the number (two) of real pages added.

(X2) The controller #0 associates the two PSCBs with the added real pages #10 and #11 individually.

(X3) The controller #0 adds new virtual pages #11 and #12 as many as the number (two) of the added real pages. The controller #0 issues an instruction to the controller #1 to add the new virtual pages #11 and #12. The controller #1 associates the virtual pages #11 and #12 with the storage apparatus #0.

(X4) The controller #0 associates the virtual pages #11 and #12 with the two PSCBs added in (X1).

(X5) The controllers #0 and #1 register the virtual pages #11 and #12 in the virtual page free queues provided in the storage apparatuses #0 and #1, respectively.

As a result of the process sequence, the capacity of the virtual pool is increased.

The capacity of the virtual pool may be initially greater than the capacity of a set of actual pool VOLs. This eliminates the need for increasing the capacity of the virtual pool itself when a pool VOL is added. For example, when a pool VOL on which a virtual pool is based is added in an environment where the capacity of the virtual pool is much greater than the capacity of a set of actual pool VOLs, it is only need to map a real page in the added pool VOL to a free virtual page through a PSCB.

Figure 38:
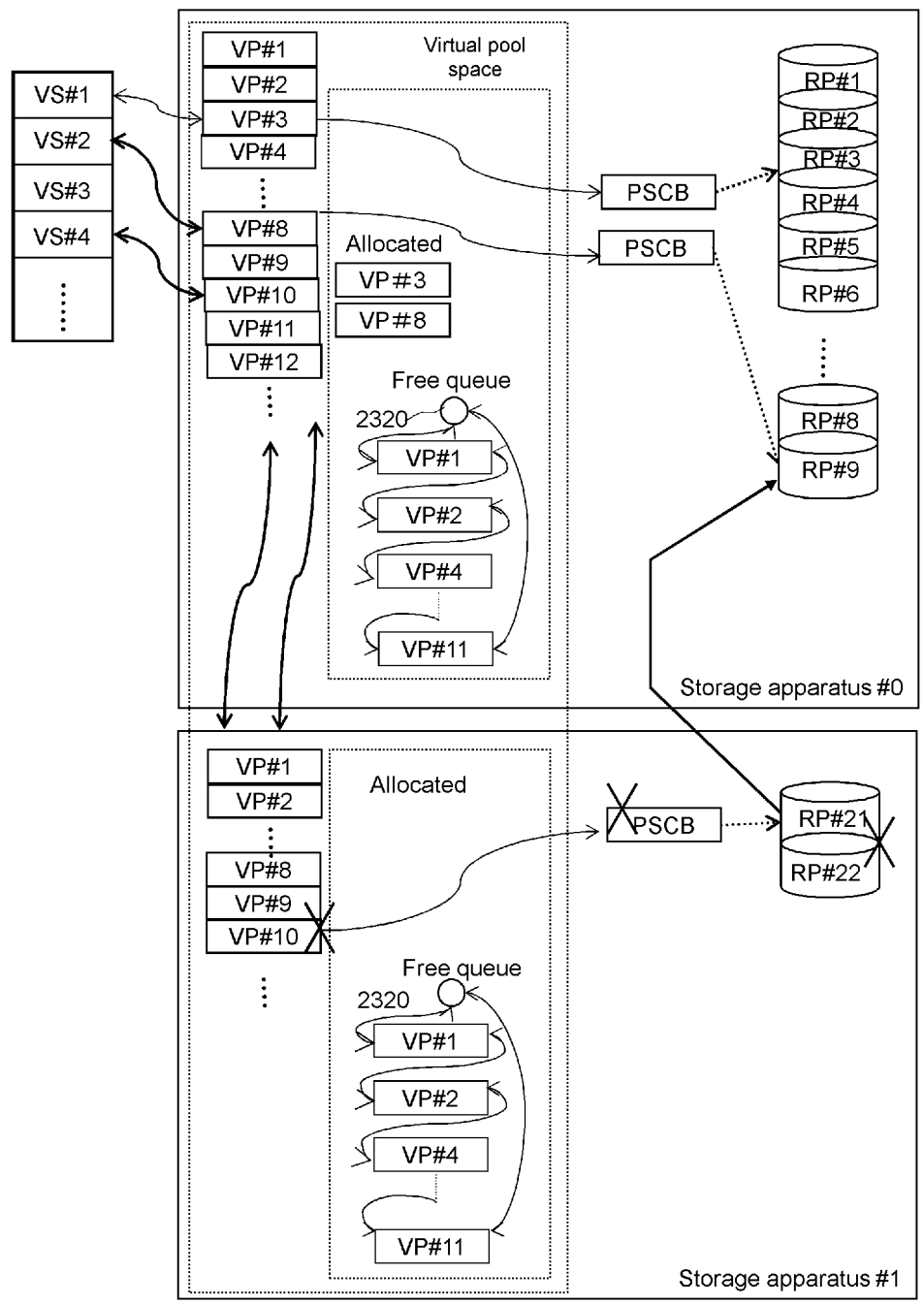
FIG. 38 is a diagram illustrating a process for deleting a pool VOL on which the virtual pool is based.

FIG. 38 is a diagram illustrating a process performed for deleting a pool VOL on which a virtual pool is based.

It is assumed here that a pool VOL having real pages #21 and #22 is to be deleted from the storage apparatus #1. In this case, the following process is performed.

(Y1) A controller #1 (for example the pool control program #1) identifies a real page that is in the pool VOL to be deleted and corresponds to a virtual page (for example #10) allocated to a virtual segment and transfers the data in the identified real page to a free virtual page (for example #8) in a different storage apparatus (for example #0). The destination virtual page is desirably a virtual page that belongs to a tier on the same level as (or on a level as close to as possible to) the tier to which the virtual page corresponding to the source real page belongs. The destination virtual page may be determined by any of the controller #1 at the source and a controller #0 (for example the pool control program #0) at the destination. For example, the controller #1 may determine a destination virtual page (for example a free virtual page) on the basis of the tier of the source virtual page and may transmit a write command in which the number of the determined destination virtual page is specified and the data in the real page corresponding to the destination virtual page to the controller #0. The controller #0 receives the data in the source real page and writes the received data in the real page corresponding to the destination virtual page. The controller #0 or #1 allocates the destination virtual page, in place of the source virtual page, to the virtual segment to which the source virtual page is allocated. Note that the controller #1 may transmit a query asking whether the destination virtual page is available or not to the controller #0 and may transmit a write command in which the destination virtual page is specified in response to a reply from the controller #0. The query and the reply may be the same as the query and reply in the descriptions provided with reference to FIGS. 34 to 36 and FIG. 19.

(Y2) The controllers #0 and #1 delete, from the virtual pool, virtual pages #9 and #10 corresponding to the real pages #21 and #22, respectively, in the pool VOL to be deleted.

(Y3) The controllers #0 and #1 delete the PSCBs corresponding to the deleted virtual pages #9 and #10, respectively.

As a result of the process sequence, the capacity of the virtual pool is decreased.

The processing in (Y1) through (Y3) varies depending on how virtual pool management is being performed. For example, in the second example of virtual pool management (see FIG. 35), the storage apparatus #0 does not manage virtual pages #9 and #10 corresponding to real pages #21 and 22 in the different storage apparatus #1. Accordingly, the controller #0 in the second example does not delete the virtual pages #9 and #10.

The capacity of the virtual pool may be initially greater than the capacity of a set of actual pool VOLs. This eliminates the need for decreasing the capacity of the virtual pool itself when a pool VOL is deleted. For example, when a pool VOL on which a virtual pool is based is deleted in an environment where the capacity of a virtual pool is much greater than the capacity of a set of actual pool VOLs, it is only need to delete mapping of a real page in the deleted pool VOL to a virtual page through a PSCB.

FIG. 39 illustrates an example of information management according to an embodiment. VOLs with numbers #1 to #4 in FIG. 39 are pool VOLs.

While a VP type table 3514 illustrated in FIG. 39 may be common to all storage apparatuses, each of the storage apparatuses does not need to have detailed information about the tiers of the other storage apparatuses. Specifically, a storage apparatus #1, for example, does not need to have detailed information about the tiers of a storage apparatus #0. More specifically, while for example a tier table #0 of the storage apparatus #0 contains detailed information about the tiers of the storage apparatus #0 (for example information indicating that virtual pages corresponding to real pages in the same storage apparatus belong to different tiers depending on the access performance of physical storage devices on which the real pages are based), a tier table #1 of the storage apparatus #1 manages, for each of different storage apparatuses, a plurality of tiers relating to a different storage (for example #0) as one tier. That is, at least one storage apparatus in this example can closely manage the tiers in that storage apparatus as well as the tiers in another storage apparatus (it recognizes different tiers in the same storage apparatus as a plurality of tiers). However, at least one other storage apparatus can closely manage the tears in that storage apparatus but manages a plurality of tiers in another storage apparatus as one tier.

A controller #1 (for example the I/O program #1 or the pool control program #1) determines in which of the storage apparatuses #1 and #0 write-target data is to be stored. If the controller #1 determines to store the data into the storage apparatus #0, the controller #1 may delegate to the storage apparatus #0 the determination of a tier in the storage apparatus #0 to which a virtual page to store the data belongs to, because the controller #1 does not have detailed information about the tiers of the storage apparatus #0. When the storage apparatus #0 receives the delegation, the storage apparatus #0 can determine a virtual page to be allocated to a write-destination virtual segment on the basis of the pool configuration in the storage apparatus #0, allocate the write-destination virtual segment to the determined virtual segment, and write the write-target data into the allocated virtual segment.

Figure 40:
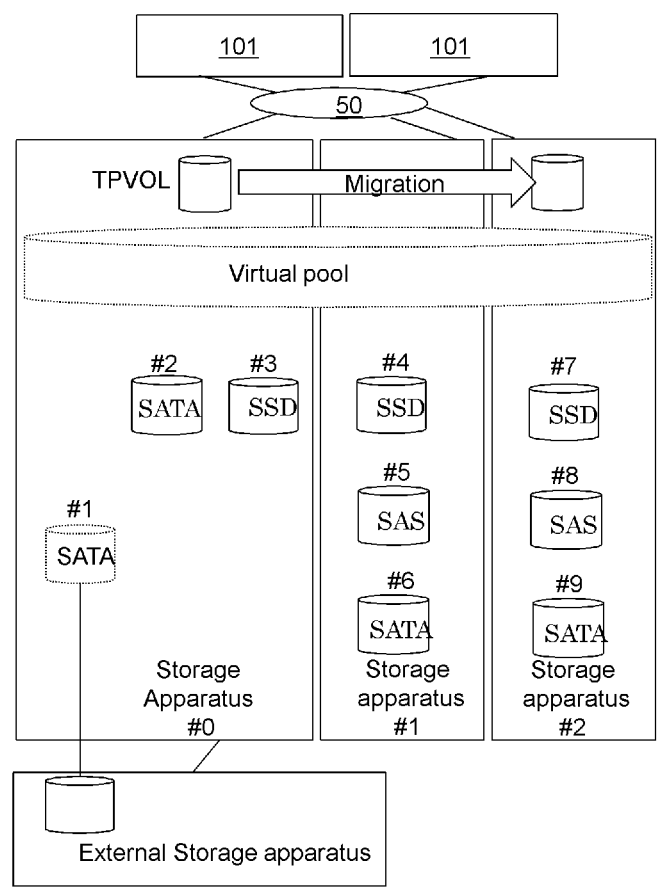
FIG. 40 is a schematic diagram of an example of TPVOL migration in one virtual storage apparatus including three storage apparatuses.

While the TPVOL migration process in one virtual storage apparatus composed of two storage apparatuses has been described with reference to FIGS. 21 to 23, the TPVOL migration process can also be performed in an environment where three (or more) storage apparatuses virtually appear to be one storage apparatus, as illustrated in FIG. 40 (VOLs with numbers #1 to #9 in FIG. 40 are pool VOLs). A relocation process (S2307 of FIG. 23) in one virtual storage apparatus composed of two storage apparatuses will be described below in detail with reference to FIG. 41A and then a relocation process (corresponding to S2307 of FIG. 23) in one virtual storage apparatus composed of three storage apparatuses will be described in detail with reference to FIG. 41B. From the descriptions, a TPVOL migration process in a virtual storage apparatus composed of more than three storage apparatuses can be derived.

Figure 41A:
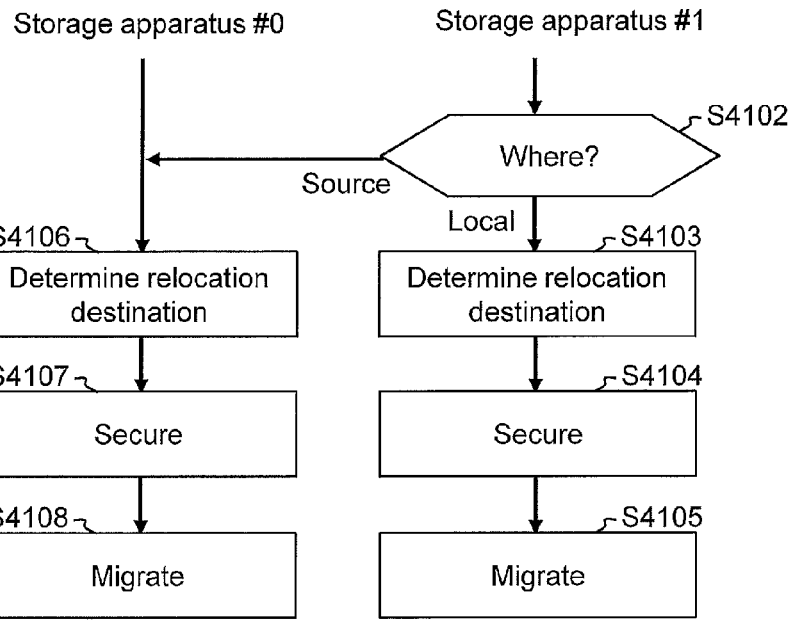
FIG. 41A illustrates details of a relocation process (S2307 of FIG. 23) in one virtual storage apparatus including two storage apparatuses.

FIG. 41A illustrates details of a relocation process (S2307 of FIG. 23) in one virtual storage apparatus composed of two storage apparatuses.

A migration-destination storage #1 (for example the pool control program #1) determines a relocation-destination storage apparatus (S4102). That is, the migration-destination storage apparatus #1 determines a storage apparatus that includes a real page corresponding to a virtual page to be selected as a virtual page of the type determined in S2304.

If destination of relocation is the local unit #1 (Local in S4102), the migration-destination storage apparatus #1 determines a relocation-destination virtual page (S4103) and secures the determined virtual page (S4104). If the migration-destination storage apparatus #1 does not have detailed information about tiers in the storage apparatus #1, the storage apparatus #1 may send a query to a given storage apparatus #0 to ask information about the tiers in the storage apparatus #1 in the relocation process and may perform S4103 on the basis of a reply to the query (a replay containing detailed information about the tiers in the storage apparatus #1). After S4104, the migration-destination storage apparatus #1 migrates data from a virtual page allocated to an allocated virtual segment for which this process is being performed to the relocation-destination virtual page (S4105). This data copy may be accomplished by the migration-destination storage apparatus

1 transmitting a read command containing the number of the migration-source virtual page to the migration-source storage apparatus #0.

If the relocation destination is the migration-source storage apparatus #0 (Source in S4102), the migration-destination storage apparatus #1 transmits information required for determining a relocation-destination virtual page and a request to determine a relocation-destination virtual page to the migration-source storage apparatus #0. The information required for determining a relocation-destination virtual page may contain information indicating a page type determined in S2304, for example, and may further contain information concerning tiers in the migration-source storage apparatus #0. The migration-source storage apparatus #0 determines a relocation-destination virtual page (S4106) and secures the determined virtual page (S4107). The migration-source storage apparatus #0 then migrates data from the virtual page allocated to the allocated virtual segment for which this process is being performed to the relocation-destination virtual page (S4108).

The relocation process may be performed for each virtual segment for which a virtual page is allocated in a migration-source (migration-target) TPVOL.

Figure 41B:
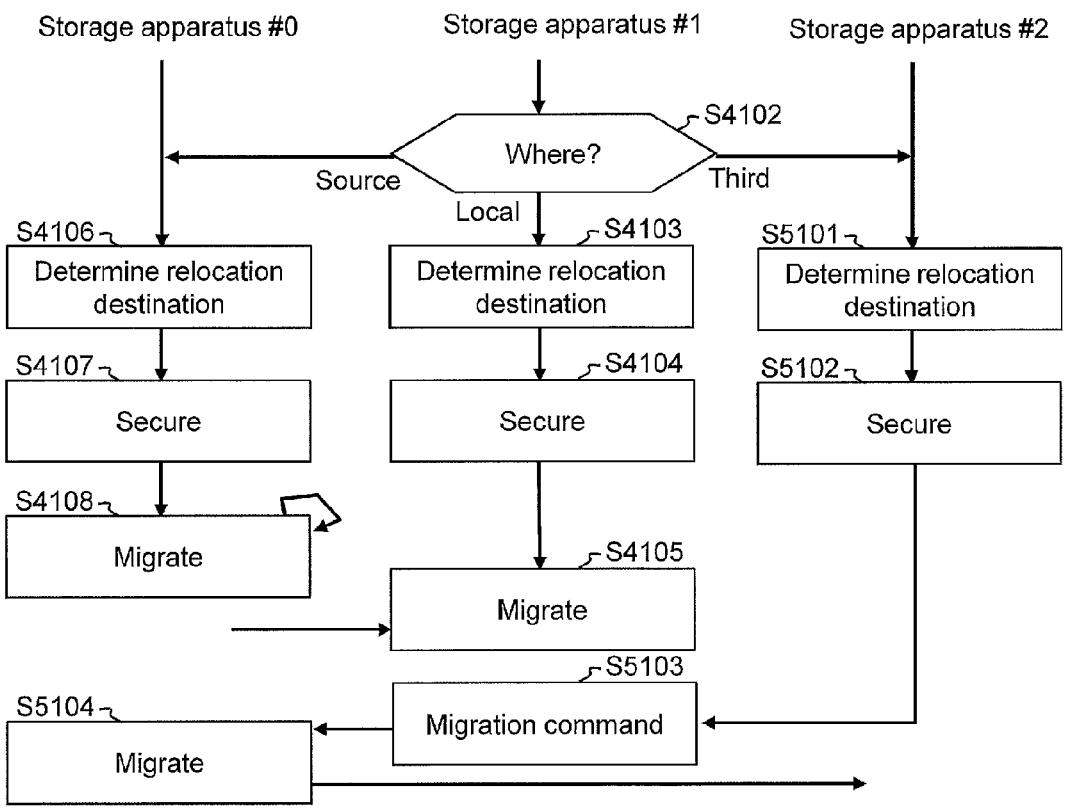
FIG. 41B illustrates details of a relocation process (corresponding to S2307 of FIG. 23) in one virtual storage apparatus including three storage apparatuses.

FIG. 41B illustrates details of a relocation process (corresponding to S2307 of FIG. 23) in one virtual storage apparatus composed of three storage apparatuses. The same processes in FIG. 41B as those in FIG. 41A are given the same step numbers.

If a virtual storage apparatus is composed of three (or more) storage apparatuses, a storage apparatus different from a migration-destination storage apparatus #1 and a migration-source storage apparatus #0 exists (the storage apparatus is referred to as a "third storage apparatus" in the following description of FIG. 41B).

If at S4102 the destination of relocation is a third storage apparatus #2 (Third in S4102), the migration-destination storage apparatus #1 transmits information required for determining a relocation-destination virtual page and a request to determine a relocation-destination virtual page to the third storage apparatus #2. The information required for determining a relocation-destination virtual page may contain information indicating a page type determined in S2304, for example, and may further contain information concerning tiers in the third storage apparatus #2. The third storage apparatus #2 determines a relocation-destination virtual page (S5101), secures the determined virtual page (S5102), and reports the completion to the migration-destination storage apparatus #1. The migration-destination storage apparatus #1 transmits a migration command to the migration-source storage apparatus #0 (or the third storage apparatus #2) to migrate data from a virtual page allocated to the allocated virtual segment for which the process is being performed to the relocation-destination virtual page (S5103). The migration-source storage apparatus #0 (or the third storage apparatus #3) receives the migration command and migrates data from the virtual page allocated to the allocated virtual segment for which this process is being performed to the relocation-destination virtual page (S5104).

Figure 42:
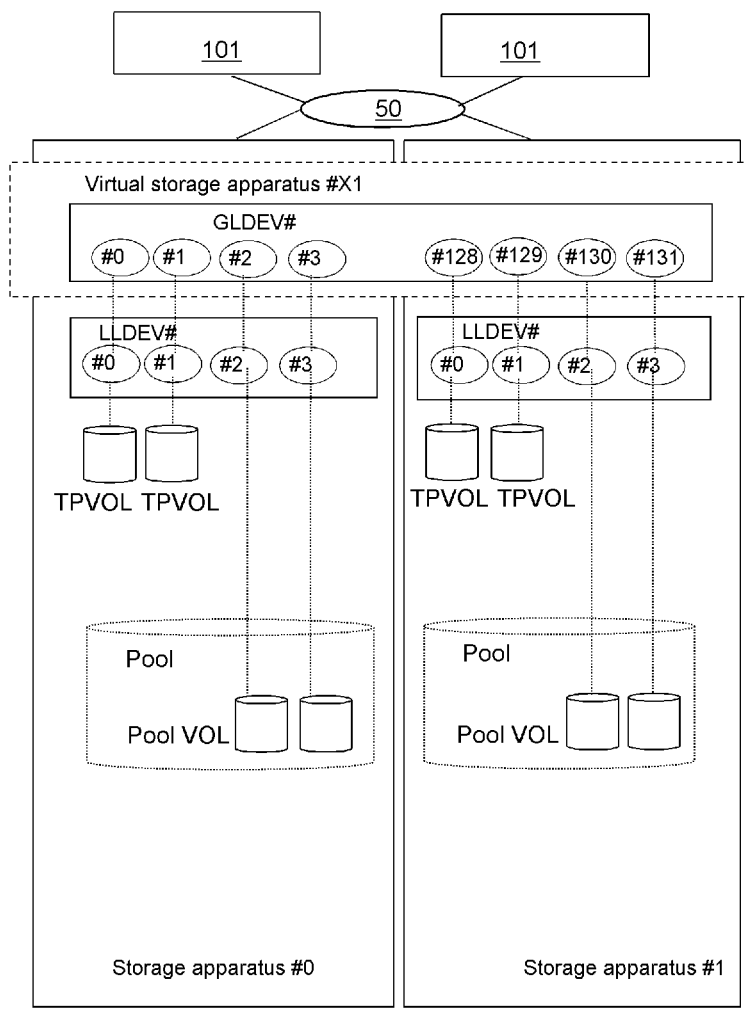
FIG. 42 illustrates an example of a configuration in which a plurality of storage apparatuses (for example storage apparatuses #0 and #1) virtually appear to be one storage apparatus.

FIG. 42 illustrates an exemplary configuration in which a plurality of storage apparatuses (for example storage apparatuses #0 and #1) virtually appear to be one storage device.

In order to implement a virtual storage apparatus, the following management is performed.

Virtual storage numbers which are the numbers of virtual storage apparatuses each composed of a plurality of storage apparatuses are managed. Furthermore, the numbers of the individual storage apparatuses are managed. Specifically, each of the storage apparatuses (for example a memory 350) constituting a virtual storage apparatus #X1 may store a virtual storage configuration table 4302. The table 4302 contains the number of each virtual storage apparatus and the number of each of the storage apparatuses constituting the virtual storage apparatus.

Figures 43A, 43B, 43C, 43D:
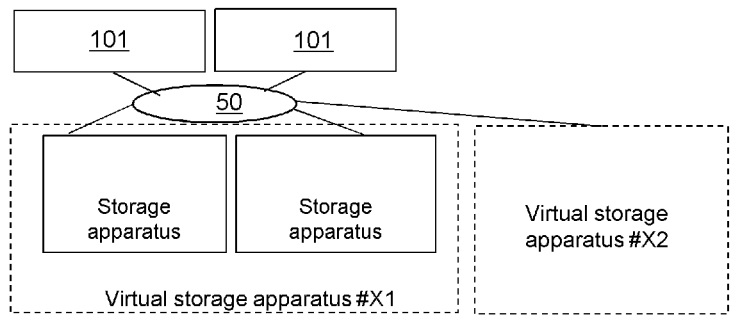
FIG. 43A illustrates one example in which a plurality of virtual storage apparatuses exist.
FIG. 43B illustrates a GLDEV management table #0 associated with the configuration illustrated in FIG. 42.
FIG. 43C illustrates a GLDEV management table #1 associated with the configuration illustrated in FIG. 42.
FIG. 43D illustrates an exemplary configuration of a virtual storage configuration table.

Furthermore, two-level LDEV numbers are managed. Specifically, for example as described above, "GLDEV #" which is an LDEV number that is unique in one virtual storage apparatus and "LLDEV #" which is a number that is unique in one storage apparatus but can be nonunique across different storage apparatuses. More specifically, for example each storage apparatus (for example a memory 350) stores a GLDEV management table 4301 indicating the correspondence between GGLDEV # and LLDEV #. For example, as illustrated in FIG. 43B a GLDEV management table #0 includes a GLDEV # and an LLDEV # for each VOL managed by the storage apparatus #0 and as illustrated in FIG. 43C a GLDEV management table #1 includes a GLDEV # and an LLDEV # for each VOL managed by the storage apparatus #1. A GLDEV # is mapped to an LLDEV #. Note that for an LDEV (VOL) that should not be recognized by the host 101, GLDEV # does not need to be associated with a TD (target device) (alternatively, GLDEV # may be an invalid value).

In the example in FIG. 42, a GLDEV # is also assigned to a pool VOL to allow each storage apparatus to manage a virtual pool as a level higher than the pool and to allocate a virtual page corresponding to a real page in another virtual pool to a write-destination virtual segment. The method for implementing this is not limited to assigning a GLDEV # to each pool VOL. For example, a valid value of GLDEV # does not need to be assigned to a VOL that should not be recognized by the host 101, such as a pool VOL. Alternatively, a GLDEV # may be assigned to a pool VOL that constitutes a virtual pool but the pool VOL on which the virtual pool is based may be prevented from being recognized by the host 101 by not associating a TD (target device) with that pool VOL.

The host 101 can transmit a process command (for example an I/O command) in which the GLDEV # of a VOL associated with a TD. The host 101 can use a VOL without needing to be aware of the physical location of the VOL, such as which of the storage apparatuses 30 contains the VOL, the distance from the host, or the amount of free space.

When a storage apparatus #0 receives a process command in which a GLDEV # is specified, the storage apparatus #0 converts the GLDEV # to an LLDEV # local to the storage apparatus #0. If an LLDEV # corresponding to the GLDEV # is not found in the storage apparatus #0, the storage apparatus #0 transfers the received process command to the storage apparatus #1 that has a converted LLDEV #.

Even if the storage apparatuses #0 and #1 use the same LLDEV # or the same copy process pair numbers, the storage apparatuses #0 and #1 can be united and used as one virtual storage apparatus by using GLDEV #.

As the host 101 issues an I/O command in which a GLDEV # is specified, access (I/O) can be continued uninterrupted even if data migrates between two storage apparatuses #0 and #1 that are physically separated. For example, when an instruction to migrate a VOL assigned with GLDEV #10 from a storage apparatus #0 to a storage apparatus #1 in a virtual storage apparatus composed of storage apparatuses #0 and #1, GLDEV #10 can be used in the migration-destination storage apparatus #1 without change and an LLDEV # mapped to the GLDEV #10 is changed from an LLDEV # local to the storage apparatus #0 to an LLDEV # local to the storage apparatus #1. The migration of the data between the storage apparatuses is transparent to the host 101. In addition, an I/O command issued from the host 101 does not affect the host 101 because GLDEV # is not changed.

Any VOL of any volume type, such as an ordinary VOL or TPVOL, that requires LDEV # (LUN) may be mapped to a GLDEV #. While LDEV # (LUN) is treated as being synonymous with LUN in this embodiment, LUN and LDEV # may be distinguished from each other and managed.

There may be a plurality of virtual storage apparatuses as illustrated in FIG. 43A.

Figure 44:
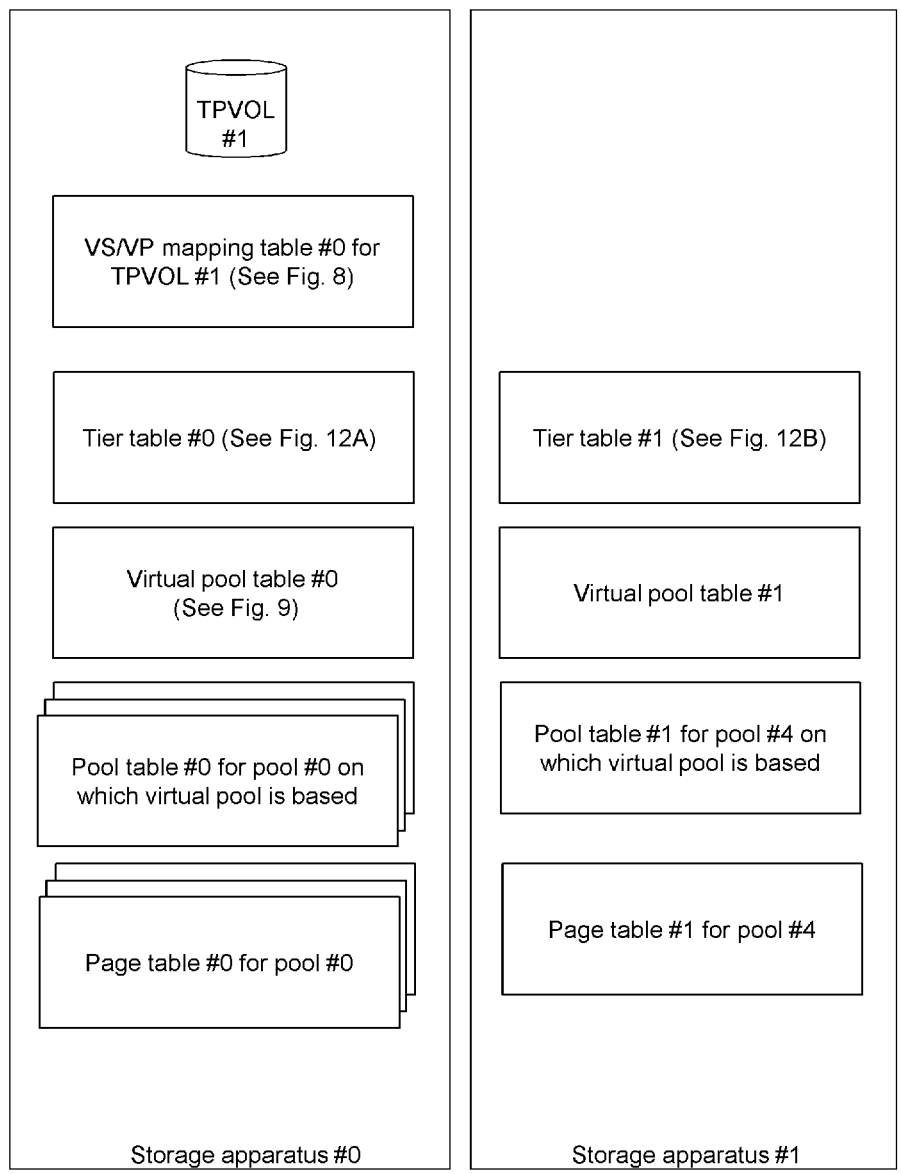
FIG. 44 illustrates management information provided in individual storage apparatuses.

As illustrated in FIG. 44, management information held by individual storage apparatuses includes overlapping items and different items. That is, if storage apparatuses #0 and #1 constitute the same virtual storage apparatus, the storage apparatus #0 has TPVOL #1 and accordingly has a VS/VP mapping table associated with TPVOL #1 but storage apparatuses other than the storage apparatus #0 do not have such a mapping table.

Both of the storage apparatuses #0 and #1 have their respective tier tables #0 and #1. However, as comparison between FIGS. 12A and 12B shows, the correspondence between tier numbers and VP type numbers in the storage apparatus #1 may differ from the correspondence between tier numbers and VP type numbers in the storage apparatus #0. This is because the I/O performances (for example I/O speeds) of virtual pages that belong to the same VP type differ between the storage apparatus #0 and the storage apparatus #1.

Furthermore, each of the storage apparatuses #0 and #1 has a pool table (see FIG. 11) and a page table (see FIG. 13) for its pools.

While one example has been described with reference to FIG. 44, the management information held by individual storage apparatuses includes overlapping items and different items as shown above.

The description of the embodiment has described which virtual page is allocated by a storage apparatus. In doing the allocation, the storage apparatus can consider which virtual image corresponding to a real page in which storage apparatus is to be allocated. For example, a free virtual page to be allocated to a write-destination virtual segment is determined in S1904 of FIG. 19. The free virtual page can be a virtual page that corresponds to a real page in one of the storage apparatuses described below. In other words, a free virtual page to be allocated to a write-destination virtual segment (or a migration-destination virtual page) may be the one that meets any of the following conditions.

(C1) A virtual page corresponding to a real page in the local storage apparatus (a storage apparatus that has received a write command), for example a virtual page in the top tier in the local storage apparatus may be selected as the write-destination virtual stage.

(C2) A virtual page in a storage apparatus according to a predetermined policy may be selected as a virtual page to be allocated to the write-destination virtual segment, or a destination virtual page. For example, if rather than a virtual page corresponding to a real page in the local storage apparatus, a virtual image corresponding to a real page in a different storage apparatus is nearer to the tier to which the migration-source virtual page belongs, the virtual page in the storage apparatus different from the source storage apparatus may be selected as the migration-destination page.

(C3) A virtual page corresponding to a real page in the storage apparatus that selects a virtual page, a virtual page corresponding to a real page in a storage apparatus detected to be currently most lightly loaded, or a virtual page corresponding to a real page in a storage apparatus nearest to the storage apparatus that selects a virtual page (for example a storage apparatus with which communication will finish earliest) may be selected as the virtual page allocated to the write-destination virtual segment or the migration-destination virtual page. As may have been stated, if a pool VOL is an EVOL, a "real page" may be a storage area constituting the EVOL.

Figure 45:
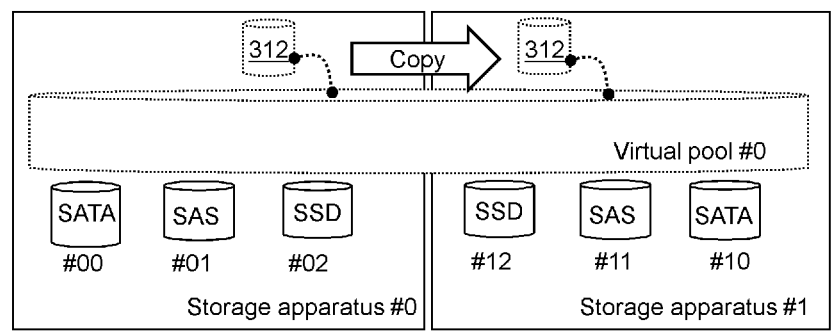
FIG. 45 illustrates an example of a copy of a TPVOL 312.

When the TPVOL 312 is copied as illustrated in FIG. 45, "migration" of the TPVOL 312 in the foregoing description can be replaced with "copy" of the TPVOL 312. Similarly, migration of data from a migration-source virtual page to a migration-destination virtual page in the foregoing description can be replaced with copy of data from a copy-source virtual page to a copy-destination virtual page. The copy-destination virtual page may be determined in accordance with the same policy as that for determining a migration-destination virtual page.

Although one embodiment has been described above, the present invention is not limited to the embodiment, and, of course, various modifications can be made without departing from the spirit of the present invention.

Figure 32:
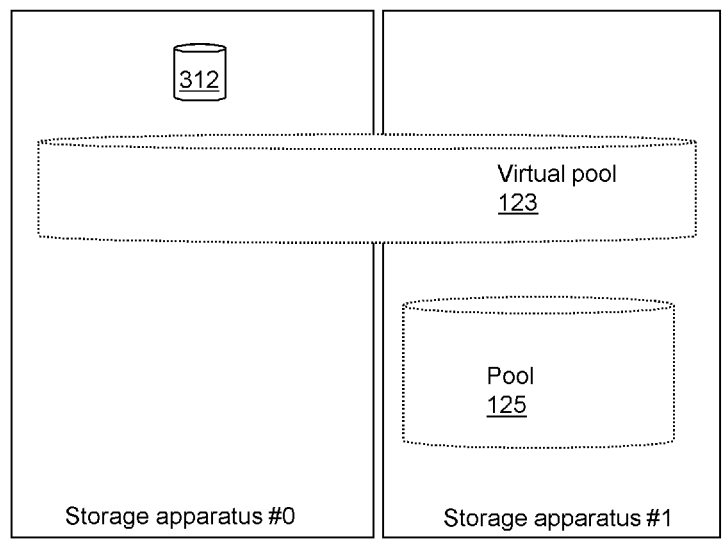
FIG. 32 is a diagram showing a variation of the configuration of the virtual pool according to the embodiment.

For example, as shown in FIG. 32, all the storage apparatuses 121 forming the storage system 111 do not always have to have a pool 125. For example, even if the storage apparatus #0 has no pool 125, the storage apparatus #0 manages the virtual pool 123 relying on the pool 125 in the storage apparatus #1 and therefore can provide the TPVOL to the host 101 (or serve the capacity virtualization function to allocate a virtual page from the virtual pool 123 to the TPVOL).

For example, a part or the whole of the process performed by the pool control program 3507 can be performed by the management computer 20 instead of the pool control program 3507. For example, the management computer 20 may acquire information included in at least one kind of information among the various kinds of information (for example, the tables 3511 to 3517, 170, 4301 and 4302 described above) held by storage apparatuses under management (the storage apparatuses constituting a virtual storage apparatus) and may centrally manage information acquired from one or more storage apparatuses.

The following expressions can be derived from the above description.

(Expression 1)

A storage system, comprising:

a plurality of storage apparatuses including a first storage apparatus and a second storage apparatus, wherein said first storage apparatus is configured to have a first virtual volume composed of a plurality of virtual segments, at least said second storage apparatus is configured to have a pool composed of a plurality of real pages, said plurality of storage apparatuses are each configured to manage one or more pools including at least said pool in said second storage apparatus as one virtual pool, said virtual pool is composed of a plurality of virtual pages, each virtual page corresponding to any of the real pages, and said first storage apparatus is configured to receive a write command that specifies an address belonging to an unallocated virtual segment to which no virtual page is allocated, allocate a free virtual page from said virtual pool to said unallocated virtual segment, and write data accompanying said write command to the real page corresponding to the allocated virtual page.

(Expression 2)

The storage system according to Expression 1, wherein said first storage apparatus is configured to store mapping information that is information that indicates which virtual page is allocated to which virtual segment, said first storage apparatus is configured to migrate said first virtual volume to a third storage apparatus that is one of said plurality of storage apparatuses other than said first storage apparatus and transmit said mapping information corresponding to said first virtual storage apparatus to said third storage apparatus, said third storage apparatus is said second storage apparatus or another storage apparatus, said third storage apparatus is configured to receive said first virtual volume and said mapping information, and said third storage apparatus is configured to receive a read command that specifies an address belonging to a virtual segment in said first virtual volume, determine a virtual page allocated to the virtual segment from said mapping information, and read data from the real page corresponding to the determined virtual page.

(Expression 3)

The storage system according to Expression 2, wherein said virtual pool is composed of a plurality of tiers, each tier is composed of two or more virtual pages of a same virtual page type, the virtual page type of the virtual page is defined according to what physical storage device in which storage apparatus the real page associated with the virtual page relies on, and the correlation between the virtual page types and the tiers differs among the storage apparatuses.

(Expression 4)

The storage system according to Expression 3, wherein each storage apparatus is configured to store tier information that indicates what virtual page type corresponds to which tier, and the migration of said first virtual volume and a volume migration process is configured to be performed, the volume migration process including:

(a) said first or third storage apparatus determining the virtual page type of a destination of data in said third storage apparatus for each of one or more virtual pages allocated to said first virtual volume based on said mapping information, the tier information in said first storage apparatus and the tier information in said third storage apparatus;

(b) said first or third storage apparatus determining whether or not, of the one or more virtual pages allocated to said first virtual volume, there is a virtual page that belongs to a virtual page type different from the virtual page type determined in said (a);

(c) if there is a virtual page that belongs to a virtual page type different from the virtual page type determined in said (a), said first or third storage apparatus migrating data from the virtual page to a virtual page that belongs to the virtual page type determined in said (a); and (d) said third storage apparatus updating said mapping information so that instead of the virtual page that is the source of the migration in said (c), the virtual page that is the destination of the migration in said (c) is allocated to the virtual segment to which the virtual page that is the source of the migration in said (c) is allocated.

(Expression 5)

The storage system according to Expression 4, wherein in said (c), said first or third storage apparatus is configured to perform the data migration if an access frequency of data in the virtual page that belongs to the virtual page type different from the virtual page type determined in said (a) is equal to or larger than a predetermined value and skips the data migration if the access frequency of the data in the virtual page that belongs to the virtual page type different from the virtual page type determined in said (a) is less than the predetermined value, and the data migration skipped in said volume migration process is configured to be performed at a time after said volume migration process.

(Expression 6)

The storage system according to Expression 4 or 5, wherein an external storage apparatus different from said plurality of storage apparatuses is coupled to said first storage apparatus, in said (c), said first or third storage apparatus performs the data migration if data in the virtual page that belongs to the virtual page type different from the virtual page type determined in said (a) exists in said first storage apparatus and skips the data migration if the data in the virtual page that belongs to the virtual page type different from the virtual page type determined in said (a) exists in said external storage apparatus, and the data migration skipped in said volume migration process is performed at a time after said volume migration process.

(Expression 7)

The storage system according to any one of Expression 4 to 6, wherein said virtual pool is based on a first real page group of two or more real pages in said first storage apparatus and a second real page group of two or more real pages in said third storage apparatus, and a plurality of real page types of said first real page group are the same as a plurality of real page types of said second real page group.

The real page type can be defined based on the medium type and the interface type of the PDEV on which the real page relies and which storage apparatus has the PDEV on which the real page relies. The storage apparatuses managed by each storage apparatus include the local unit, which means the storage apparatus itself, another unit, which means another storage apparatus, and an external unit, which means an external storage apparatus that is not included in the storage system but is coupled to the local unit.

(Expression 8)

The storage system according to any one of Expression 4 to 7, wherein said first and third storage apparatuses are configured to manage a first virtual pool that is said virtual pool and a second virtual pool that is another virtual pool, a plurality of real page types of a first real page group that is a real page group on which said first virtual pool relies are the same as a plurality of real page types of a second real page that is a real page group on which said second virtual pool relies, and said first or third storage apparatus is configured to associate said first virtual volume migrated to said third storage apparatus with said second virtual pool instead of said first virtual pool.

(Expression 9)

The storage system according to any one of Expression 2 to 8, wherein there are a plurality of lanes including a first lane and a second lane, each lane is a data placement range, two or more real pages of the plurality of real pages on which said virtual pool relies belonging to each lane, said third storage apparatus is configured to change the lane associated with said first virtual volume from said first lane to said second lane.

(Expression 10)

The storage system according to Expression 9, wherein said second lane is a lane whose configuration is the closest to the configuration of said first lane among said plurality of lanes.

(Expression 11)

The storage system according to any one of Expression 1 to 10, wherein a fourth storage apparatus that is one of said plurality of storage apparatuses is configured to perform rebalancing to migrates data in the real page corresponding to the virtual page allocated to said first virtual volume to another real page.

(Expression 12)

The storage system according to Expression 11, wherein a fifth storage apparatus that is one of said plurality of storage apparatuses is configured to have a second virtual volume, said fourth storage apparatus is said first or fifth storage apparatus, and if a first real page corresponding to a first virtual page allocated to said first virtual volume exists in said fifth storage apparatus, and a second real page corresponding to a second virtual page allocated to said second virtual volume exists in said first storage apparatus, said fourth storage apparatus is configured to have interchange data between said first and second real pages, associate said first virtual page with said second real page instead of said first real page and associate said second virtual page with said first real page instead of said second real page in said rebalancing.

(Expression 13)

The storage system according to any one of Expression 1 to 12, wherein each real page relies on a storage device, and N virtual pages having successive addresses (N represents an integer equal to or larger than 2) are associated with N real pages in different storage devices.

(Expression 14)

The storage system according to any one of expressions 1 to 13, wherein at least one of said plurality of storage apparatuses comprises a free queue that is a queue composed of one or more entries, each corresponding to one of one or more free virtual pages with one or more free virtual pages; and if a free virtual page to be allocated to the unallocated virtual segment is a first virtual page corresponding to a real page in a pool in the second storage apparatus, said first storage apparatus sends an inquiry relating to the first virtual page to said storage apparatus with the free queue, and said storage apparatus with the free queue receives the inquiry, in response to said inquiry, secures the first virtual page from the free queue to set the first virtual page to an allocated status, and transmits a reply indicating that the first virtual page has been allocated to said first storage apparatus, and said first storage apparatus receives the reply and allocates the first virtual page to the unallocated virtual segment.

(Expression 15)

The storage system according to expression 14, wherein if the first virtual page has been allocated, said storage apparatus with the free queue secures, from the free queue, a second virtual page which is a free virtual page different from the first virtual page and which corresponds to a real page in the pool provided in said second storage apparatus, to set the second virtual page to an allocated status, and transmits a reply indicating that the second virtual page has been allocated to said first storage apparatus, and said first storage apparatus receives the reply and allocates the second virtual page to the unallocated virtual segment.

(Expression 16)

A pool virtualization method that is performed in a storage system comprising a plurality of storage apparatuses including a first storage apparatus and a second storage apparatus, said first storage apparatus having a first virtual volume composed of a plurality of virtual segments, and at least said second storage apparatus having a pool composed of a plurality of real pages, wherein one or more pools including at least said pool in said second storage apparatus is managed as one virtual pool having a plurality of virtual pages corresponding to any of the real pages, thereby allowing said first storage apparatus to receive a write command that specifies an address belonging to an unallocated virtual segment to which no virtual page is allocated and allocate a free virtual page from said virtual pool to said unallocated virtual segment.

(Expression 17)

A first storage apparatus coupled to one or more storage apparatuses including a second storage apparatus and to a host computer, comprising:

a communication interface device coupled to said one or more storage apparatuses; and a control device coupled to said communication interface, wherein at least said second storage apparatus is configured to have a pool composed of a plurality of real pages, said control device is configured to manage a first virtual volume composed of a plurality of virtual segments and manage one or more pools including at least said pool in said second storage apparatus as one virtual pool, said virtual pool is composed of a plurality of virtual pages, each virtual page corresponding to any of the real pages, and said control device is configured to receive from said host computer a write command that specifies an address belonging to an unallocated virtual segment to which no virtual page is allocated, allocate a free virtual page from said virtual pool to said unallocated virtual segment, and write data accompanying said write command to the real page corresponding to the allocated virtual page.

Figure 46:
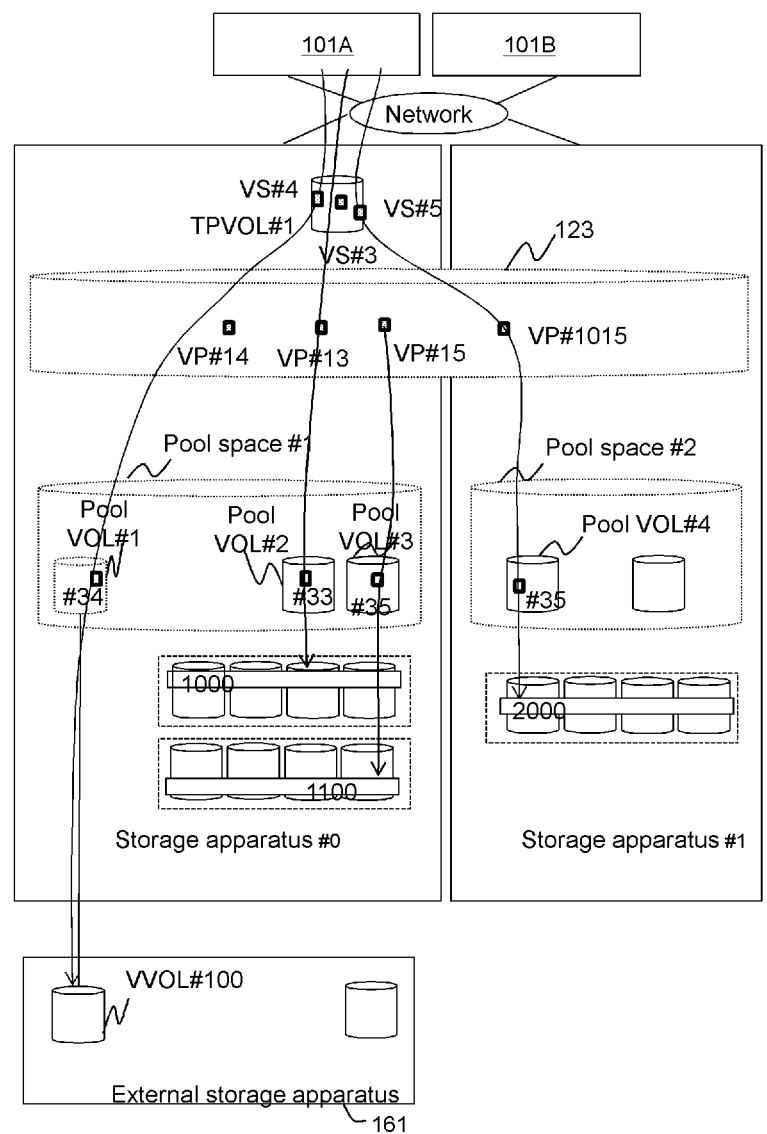
FIG. 46 illustrates an example of allocation.
Figure 47:
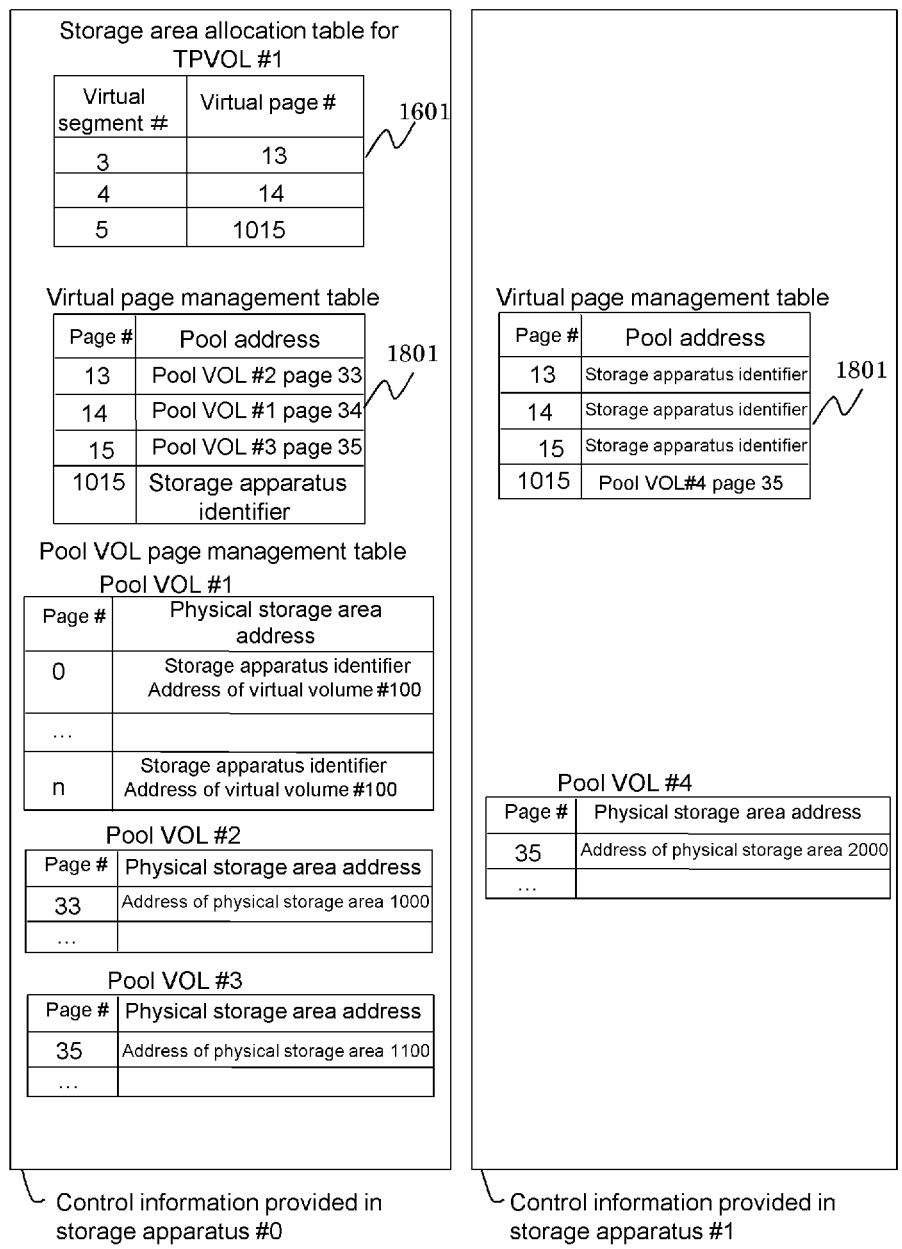
FIG. 47 illustrates an example of information provided in respective storage device #0 and #1 shown in FIG. 46.

A specific example will be described with reference to FIG. 46 and FIG. 47.

(*) A pool space page management table may be possessed by both the storage apparatuses #0 and #1.

(*) The virtual pages #13, #14, and #15 are finally mapped to physical storage areas in the storage apparatus #0. The virtual page #1015 is finally mapped to a physical storage area in the storage apparatus #1.

(*) The virtual pool space page management table provided in the storage apparatus #0 will be described. Since the virtual pages #13, #14, and #15 are allocated to the physical storage areas in the storage apparatus #0, the pool volume numbers and page numbers corresponding to the physical storage areas are stored in the table. Since the virtual page #1015 is allocated to the physical storage area in the different storage apparatus #1, an identifier indicative of a storage apparatus #1 is stored in the table. A pool VOL page management table can be searched for the addresses of the physical storage areas based on the pool VOL#s and page numbers corresponding to the virtual pages #13, #14, and #15. For the virtual page #1015, information on the storage apparatus identifier is stored. Thus, the storage apparatus #0 requests the storage apparatus #1 indicated by the storage apparatus identifier to search for the address of the physical storage area.

(*) The pool VOL #1 is mapped to a virtual volume in the external storage apparatus, and thus information indicative of the mapping is stored in the table.

(*) On the other hand, for the virtual pages #13, #14, and #15, the virtual pool space page management table provided in the storage apparatus #1 includes an identifier indicative of the storage apparatus #0 because the virtual pages #13, #14, and #15 correspond to the different storage apparatus #0. Since the virtual page #1015 is finally allocated to the physical storage area in the storage apparatus #1, the pool VOL number and page number corresponding to the physical storage area are stored in the virtual pool space page management table.

(*) Thus, the contents of information stored in the storage apparatus for each virtual page in the same virtual pool varies between the storage apparatus #0 and the storage apparatus #1.

Figure 48:
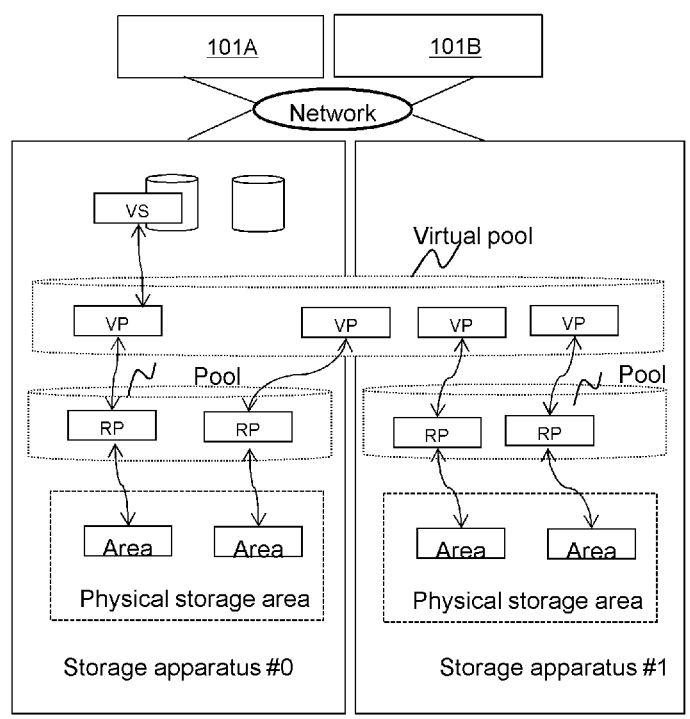
FIG. 48 illustrates an example of allocation.

As shown in FIG. 48, one tier of pool space may be provided below the virtual pool. In this case, a pool space identifier may be stored in a virtual pool management table, and storage apparatus identifiers (IDs or the like) may be stored in a pool space management table (not shown in the drawings) for the respective pool space numbers. The above-described embodiment performs the mapping from the virtual pool space directly to real pages in pool volumes. A plurality of virtual pools may be provided each of which manages, as a single pool, the pools present in the plurality of storage apparatuses 121 in an integrated manner. Certain pools may be combined together into a virtual pool, which may be provided to the host 101. All physical storage areas in pools which are to be integrated into a single pool may be allocated to virtual pages in the virtual pool. The virtual pool may include virtual pages of a predetermined page size. The virtual page may correspond to, for example, an area of the page size in the physical storage area. The TPVOLs may include those to which storage areas from the single storage apparatus 121 are assumed to be allocated (TPVOLs to which real pages from the pool in the storage apparatus 121 are allocated) and those to which virtual pages from virtual pools managed by a plurality of the storage apparatuses 121 are assigned.

REFERENCE SIGNS LIST

111 storage system
121 storage apparatus
123 virtual pool
125 pool

The invention claimed is:

1. A computer system, comprising a plurality of apparatuses including a first apparatus and a second apparatus,
wherein said first apparatus has a first virtual volume including a plurality of virtual segments,
wherein said second apparatus is configured to manage at least one storage device configured to form a pool including a plurality of real storage areas,
wherein said plurality of apparatuses are configured to manage one or more pools including said pool in said second apparatus as one virtual pool including a plurality of virtual storage areas, each virtual storage area corresponding to any of real storage areas of said one or more pools, and
wherein, in response to receiving a write request to a virtual segment of said first virtual volume, said first apparatus is configured to:
identify said second apparatus as an apparatus managing a real storage area corresponding to a virtual storage area of said virtual pool,
secure said virtual storage area among said plurality of apparatuses by communicating with said second apparatus managing said real storage area corresponding to said virtual storage area,
allocate said virtual storage area to said virtual segment of said first virtual volume, and
send said second apparatus data related to said write request for storing in said real storage area corresponding to said virtual storage area.

2. The computer system according to claim 1, wherein said second apparatus is configured to receive said data related to said write request and store said data in said real storage area corresponding to said virtual storage area.

3. The computer system according to claim 1, wherein said plurality of apparatuses include at least one storage apparatus.

4. The computer system according to claim 1, wherein said plurality of apparatuses include at least one computer.

5. A method performed by a computer system comprising a plurality of apparatuses, the plurality of apparatuses including a first apparatus and a second apparatus,
wherein said first apparatus has a first virtual volume including a plurality of virtual segments,
wherein said second apparatus manages at least one storage device configured to form a pool including a plurality of real storage areas,
wherein said plurality of apparatuses manage one or more pools including said pool in said second apparatus as one virtual pool including a plurality of virtual storage areas, each virtual storage area corresponding to any of real storage areas of said one or more pools, and
the method comprising:
in response to receiving a write request to a virtual segment of said first virtual volume,
identifying, by said first apparatus, said second apparatus as an apparatus managing a real storage area corresponding to a virtual storage area of said virtual pool,
securing, by said first apparatus, said virtual storage area among said plurality of apparatuses by communicating with said second apparatus managing said real storage area corresponding to said virtual storage area,
allocating, by said first apparatus, said virtual storage area to said virtual segment of said first virtual volume, and
sending, by said first apparatus, said second apparatus data related to said write request for storing in said real storage area corresponding to said virtual storage area.

* * * * *